(12) United States Patent
Choi et al.

(10) Patent No.: US 7,142,264 B2
(45) Date of Patent: Nov. 28, 2006

(54) UNIT FOR RECEIVING A DISPLAY MODULE, DISPLAY MODULE AND DISPLAY APPARATUS HAVING THE SAME

(75) Inventors: Yong-Seok Choi, Suwon-si (KR); Jong-Dae Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 107 days.

(21) Appl. No.: 10/818,212

(22) Filed: Apr. 5, 2004

(65) Prior Publication Data

US 2005/0018101 A1    Jan. 27, 2005

(30) Foreign Application Priority Data

Jul. 24, 2003    (KR)    ............... 10-2003-0051025

(51) Int. Cl.
*G02F 1/1333*    (2006.01)
*G02F 1/1335*    (2006.01)

(52) U.S. Cl. .............. 349/58; 349/62; 349/65
(58) Field of Classification Search ......... 349/58–65
See application file for complete search history.

(56) References Cited

U.S. PATENT DOCUMENTS 5,729,310 A * 3/1998 Horiuchi et al. ............ 349/62
6,724,445 B1 * 4/2004 Natsuyama ................. 349/58
6,894,738 B1 * 5/2005 Kasuga ...................... 349/58
6,950,154 B1 * 9/2005 Lee ............................ 349/58
2001/0026334 A1 * 10/2001 Natsuyama ................. 349/58

* cited by examiner

*Primary Examiner*—Huyen Ngo
(74) *Attorney, Agent, or Firm*—Cantor Colburn LLP

(57) ABSTRACT

A receiving unit receives a display panel that displays an image and a lamp that provides the display panel with a light. The receiving unit includes a receiving member, a combining member and a covering member. The receiving member includes a bottom plate and a first sidewall that protrudes from an edge of the bottom plate. The combining member is combined with the receiving member, and the combining member includes a first hole. The covering member includes an upper plate and a second sidewall that protrudes from an edge of the upper plate. The covering member includes a first combining portion that has a second corresponding to the first hole. The receiving unit enhances productivity in assembling process of the LCD module. Further, the combining member prevents a distortion of the receiving unit.

26 Claims, 21 Drawing Sheets

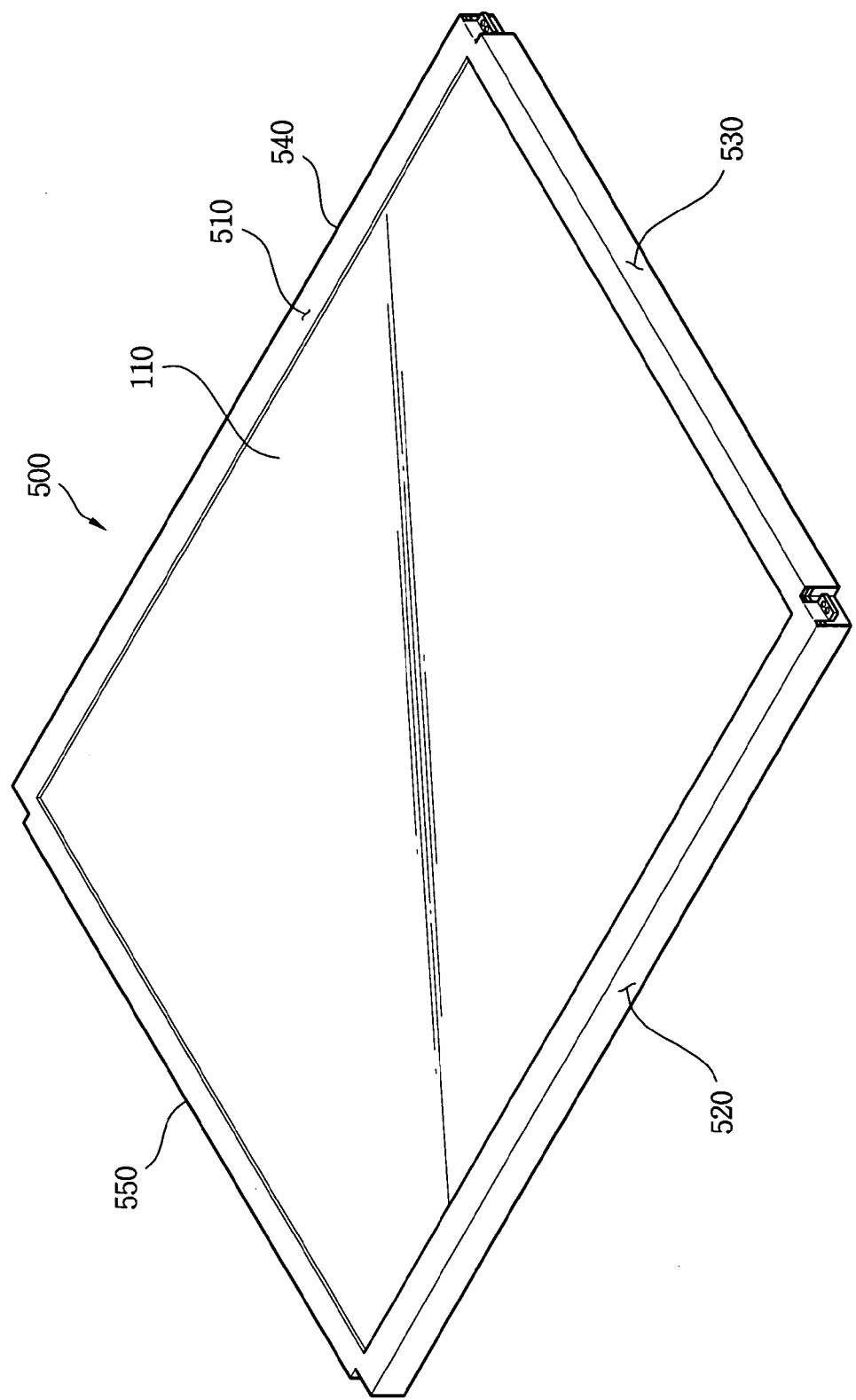

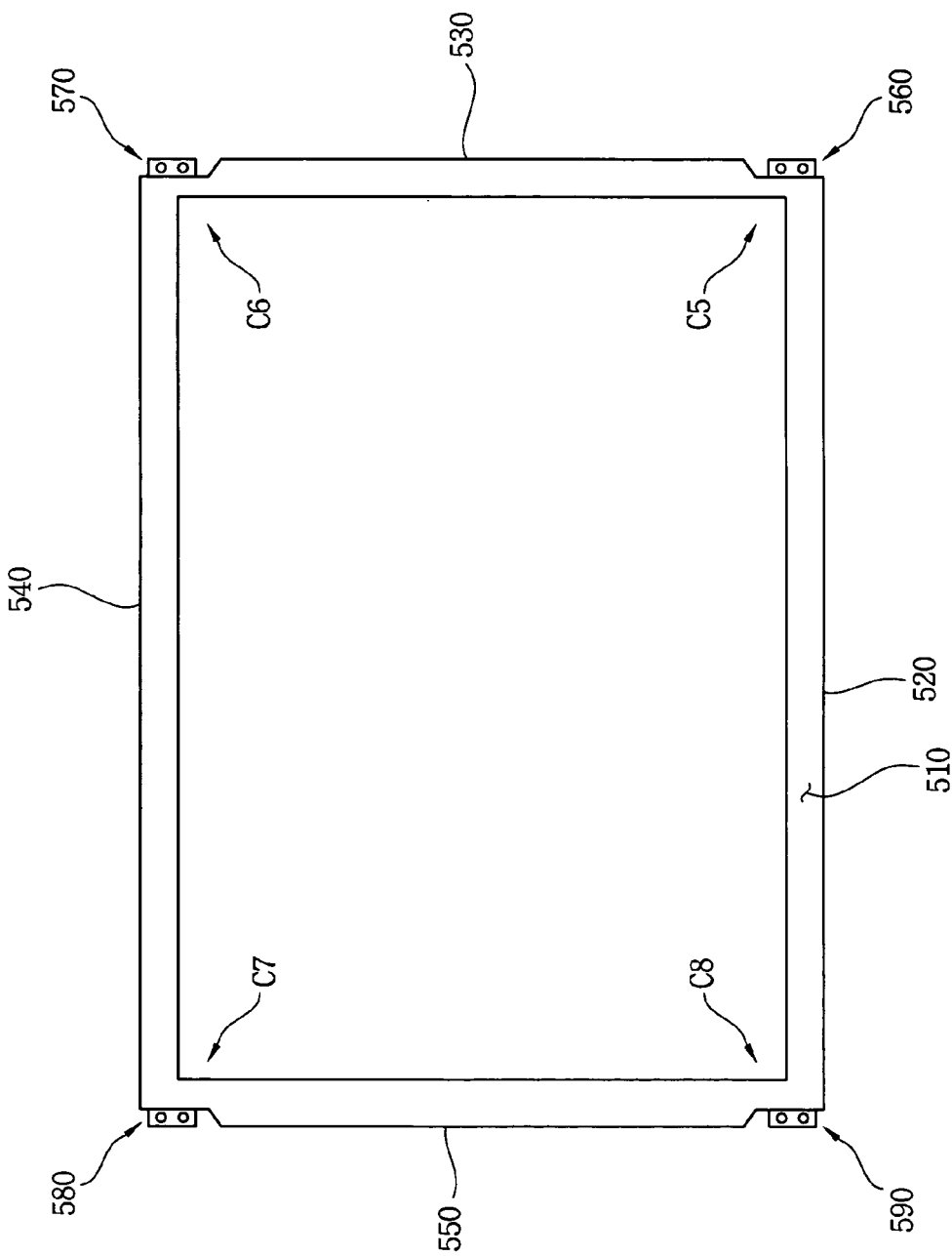

UNIT FOR RECEIVING A DISPLAY MODULE, DISPLAY MODULE AND DISPLAY APPARATUS HAVING THE SAME

CROSS-REFERENCE TO RELATED APPLICATIONS

This application relies for priority upon Korean Patent Application No.2003-51025 filed on Jul. 24, 2003, the contents of which are herein incorporated by reference in its entirety.

BACKGROUND OF THE INVENTION

1. Field of the Invention

The present invention relates to a module for receiving a display module, a display module and a display apparatus having the receiving module. More particularly, the present invention relates to a receiving module for enhancing productivity and binding force, a display module and a display apparatus having the receiving module.

2. Description of the Related Art

As a liquid crystal display apparatus becomes larger, a liquid crystal display module and a case for the liquid crystal display module also become larger. Thus, a structure for combining the liquid crystal display module and the case has been researched.

Further, as the liquid crystal display apparatus becomes larger, a liquid crystal display unit and a receiving container for containing a backlight assembly also become larger.

Generally, the receiving container is formed via an injection molding. Thus, when the receiving container becomes larger, the following problems occur.

An injection molding machine of a large size is required, and other machine, for example, such as transferring equipment etc., having a large size is also required. Thus, a new injection molding machine for forming the receiving container of a large size is manufactured to increase manufacturing cost, aside from troubles of manufacturing the receiving container.

Further, the receiving container of a large size, which is formed via an injection molding, may be distorted easily. The injection molding is performed at a high temperature. Thus, when the receiving container is formed, the receiving container is cooled down to contract. An amount of contraction is directly proportional to the size of the receiving container. Thus, as the receiving container becomes larger, the amount of contraction also increases, so that even a minute difference may cause the distortion of the receiving container. Thus, productivity of the receiving container is lowered.

SUMMARY OF THE INVENTION

The present invention provides a display module having a unit for receiving a display module, which is not easily distorted and increases productivity.

The present invention also provides a display module having the receiving unit.

The present invention also provides a display apparatus having the display module.

In an exemplary receiving unit of the present invention, the receiving unit receives a display panel that displays an image and a lamp that provides the display panel with a light. The receiving unit includes a receiving member, a combining member and a covering member. The receiving member includes a bottom plate and a first sidewall that protrudes from an edge of the bottom plate. The combining member is combined with the receiving member, and the combining member includes a first hole. The covering member includes an upper plate and a second sidewall that protrudes from an edge of the upper plate. The covering member includes a first combining portion that has a second corresponding to the first hole.

In an exemplary display module of the present invention, the display module includes a lamp, a first receiving member, a combining member, a display panel and a covering member. The lamp generates a light. The first receiving member receives the lamp, and the first receiving member includes a first bottom plate and a first sidewall that protrudes upward from an edge of the bottom plate. The combining member is combined with the first receiving member, and the combining member includes a first hole. The display panel displays an image by using the light generated from the lamp. The covering member includes an upper plate and a second sidewall that protrudes downward from an edge of the upper plate to cover the display panel. The covering member includes a first combining portion that has a second hole corresponding to the first hole.

In an exemplary display apparatus of the present invention, the display apparatus includes a display module and a case. The display module includes a lamp, a first receiving member, a combining member, a display panel and a covering member. The lamp generates a light. The first receiving member receives the lamp, and the first receiving member includes a first bottom plate and a first sidewall that protrudes upward from an edge of the bottom plate. The combining member is combined with the first receiving member, and the combining member includes a first hole. The display panel displays an image by using the light generated from the lamp. The covering member includes an upper plate and a second sidewall that protrudes downward from an edge of the upper plate to cover the display panel. The covering member includes a first combining portion that has a second hole corresponding to the first hole. The case covers the display module, and the case includes a second combining portion that has a fixing hole corresponding to the first and second holes.

According to a receiving unit, the receiving unit enhances productivity in an assembling process of the LCD module. Further, the combining member prevents a distortion of the receiving unit.

BRIEF DESCRIPTION OF THE DRAWINGS

The above and other features and advantage points of the present invention will become more apparent by describing in detailed exemplary embodiments thereof with reference to the accompanying drawings, in which:

FIG. 13 is a perspective view showing a top chassis of FIG. 1;

FIG. 14 is a plan view showing a top chassis of FIG. 13;

DESCRIPTION OF THE PREFERRED EMBODIMENTS

Hereinafter, the preferred embodiments of the present invention will be described in detail with reference to the accompanied drawings.

Figure 1:
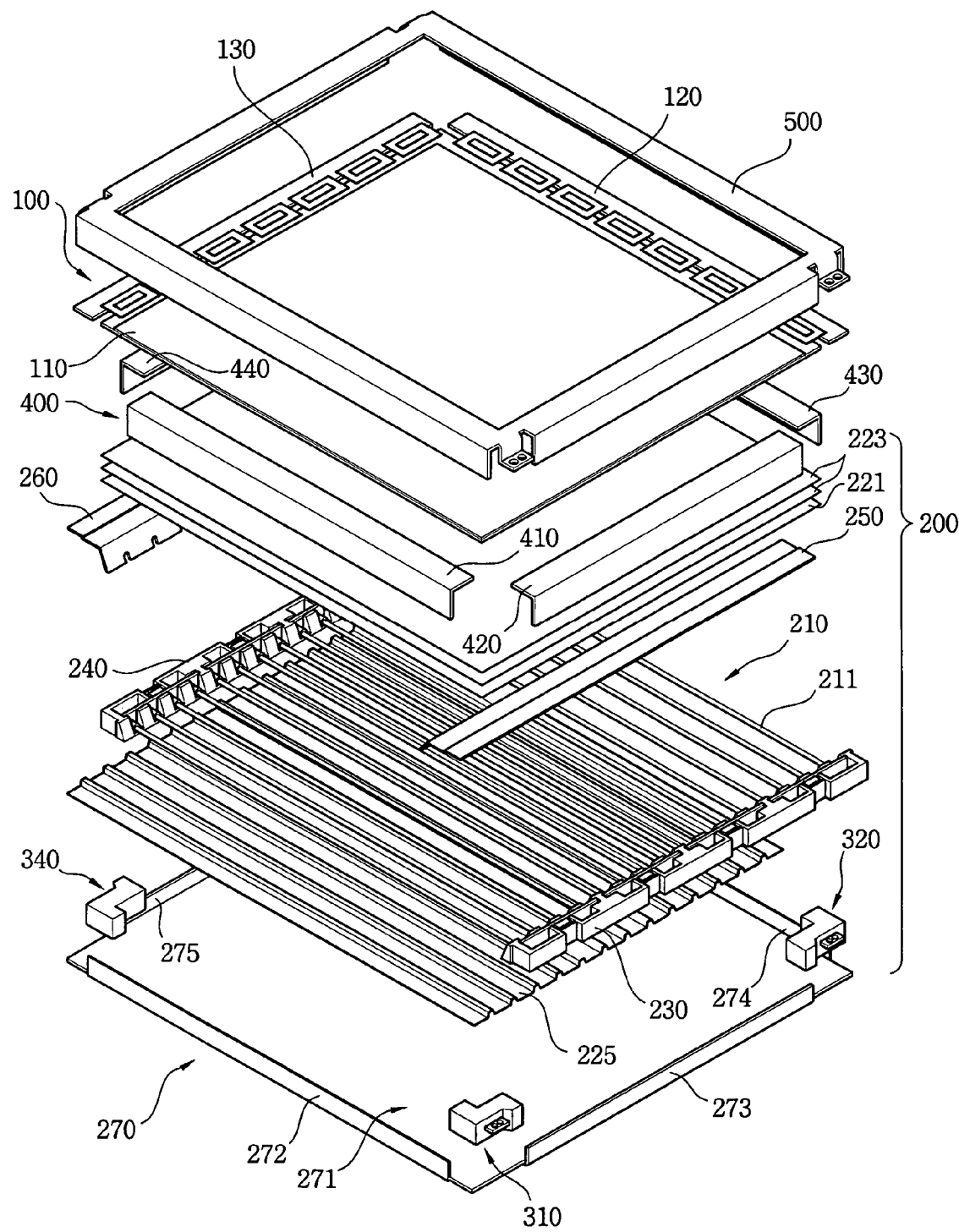
FIG. 1 is an exploded perspective view showing a liquid crystal display module according to an exemplary embodiment of the present invention.
Figure 2:
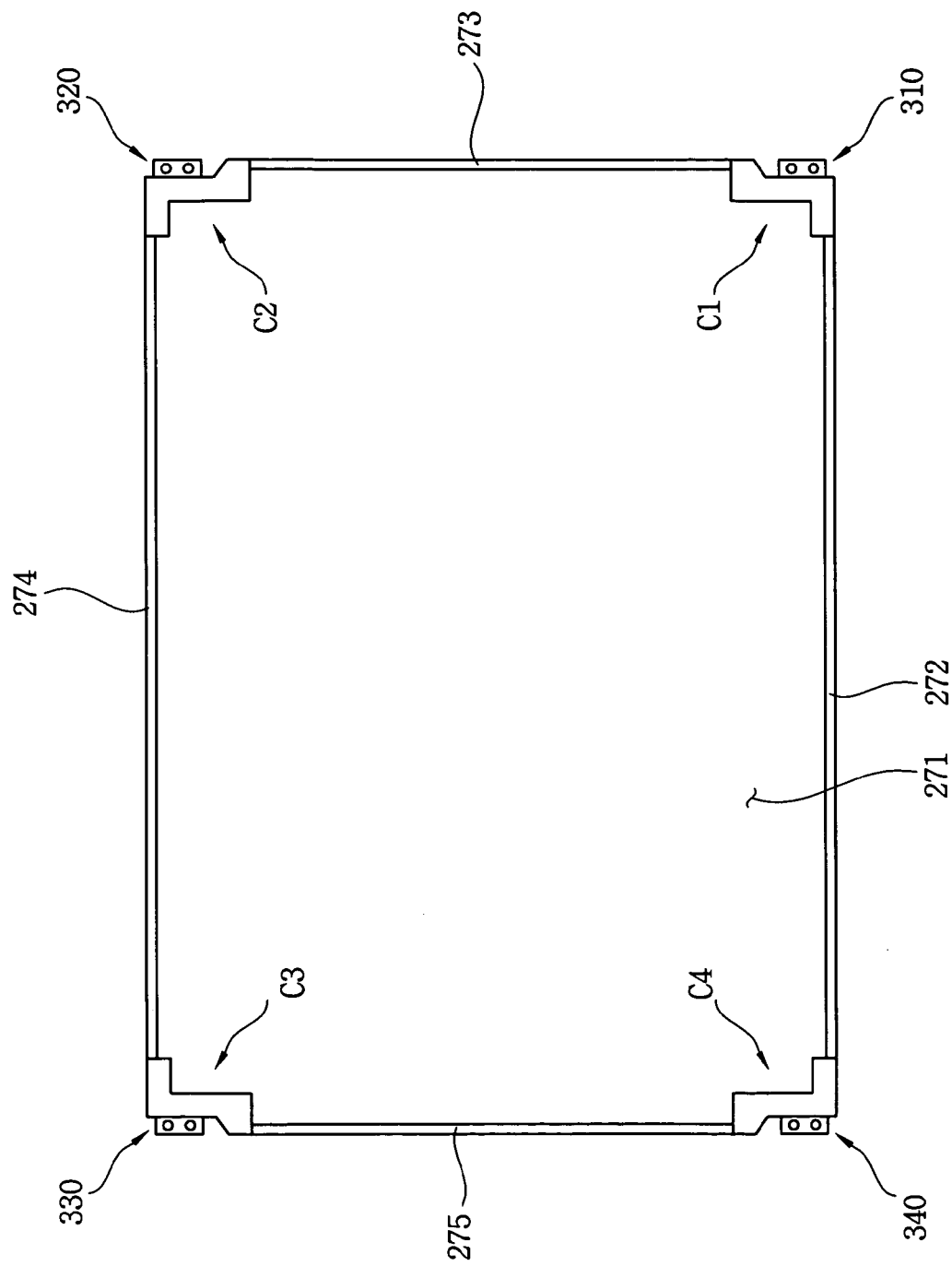
FIG. 2 is a plan view showing combination of a bottom chassis and first to fourth combining members of FIG. 1.

FIG. 1 is an exploded perspective view showing a liquid crystal display module according to an exemplary embodiment of the present invention, and FIG. 2 is a plan view showing combination of a bottom chassis and first to fourth combining members of FIG. 1.

Referring to FIG. 1, a liquid crystal display module 600 according to an exemplary embodiment of the present invention includes a display unit 100 for displaying an image and a backlight assembly 200 for providing the display unit 100 with a light.

The display unit 100 includes a liquid crystal display panel 110 for displaying an image 110, a gate printed circuit board 120 and a data printed circuit board 130.

The gate printed circuit board 120 and the data printed circuit board 130 drive the liquid crystal display panel 110.

The backlight assembly 200 includes a lamp unit 210 having a plurality of lamps 211 arranged in parallel with each other. A diffusion plate 221 for diffusing a light generated from the lamps 211 is disposed on the lamp unit 210, and optical sheets for enhancing optical characteristics, such as luminance, viewing angle, etc., are disposed on the diffusion plate 221. A reflection plate 225 is disposed under the lamp unit 210 to reflect a light generated from the lamp unit 210 toward the diffusion plate 221.

The backlight assembly 200 further includes first and second lower molds 230 and 240, and first and second upper molds 250 and 260. The first and second lower molds 230 and 240 receive first and second end portions of the lamps 211, respectively. The first and second upper molds 250 and 260 combine with the first and second lower molds, respectively to cover the first and second end portions of the lamps 211.

As shown in FIGS. 1 and 2, a bottom chassis 270 includes a bottom plate 271 and first to fourth sidewalls 272, 273, 274 and 275 protruding from the bottom plate 271, so that the bottom plate 271 and the first to fourth sidewalls 272, 273, 274 and 275 define a receiving space for receiving elements of the backlight assembly 200.

The bottom chassis 270 receives first to fourth combining members 310, 320, 330 and 340, such that the first to fourth combining members 310, 320, 330 and 340 are disposed at first to fourth corners C1, C2, C3 and C4 of the bottom chassis 270.

Particularly, the first and second sidewalls 272 and 273 are coupled with each other to form the first corner C1, and the first combining member 310 is disposed at the first corner C1. The second and third sidewalls 273 and 274 are coupled with each other to form the second corner C2, and the second combining member 320 is disposed at the second corner C2. The third and fourth sidewalls 274 and 275 are coupled with each other to form the third corner C3, and the third combining member 330 is disposed at the third corner C3. The fourth and first sidewalls 275 and 272 are coupled with each other to form the fourth corner C4, and the fourth combining member 340 is disposed at the fourth corner C4.

Portions of the first to fourth sidewalls 272, 273, 274 and 275 are cut out at the first to fourth corners C1 to C4, so that the first to fourth combining members 310, 320, 330 and 340 disposed at the first to fourth corners C1 to C4, respectively, are exposed.

The first and third combining members 310, 320, 330 and 330 have a substantially identical shape with each other, the second and the fourth combining members 320, 320, 330, and 340 have a substantially identical shape with each other, and the first and third combining members 310, 320, and 330 and the second and the fourth combining members 320, 330, and 340 are symmetrical with each other. Thus, referring to FIG. 3, the first combining member 310 is explained, and any further explanation of the second to fourth combining members 320, 330, and 340 will be omitted.

Figure 3:
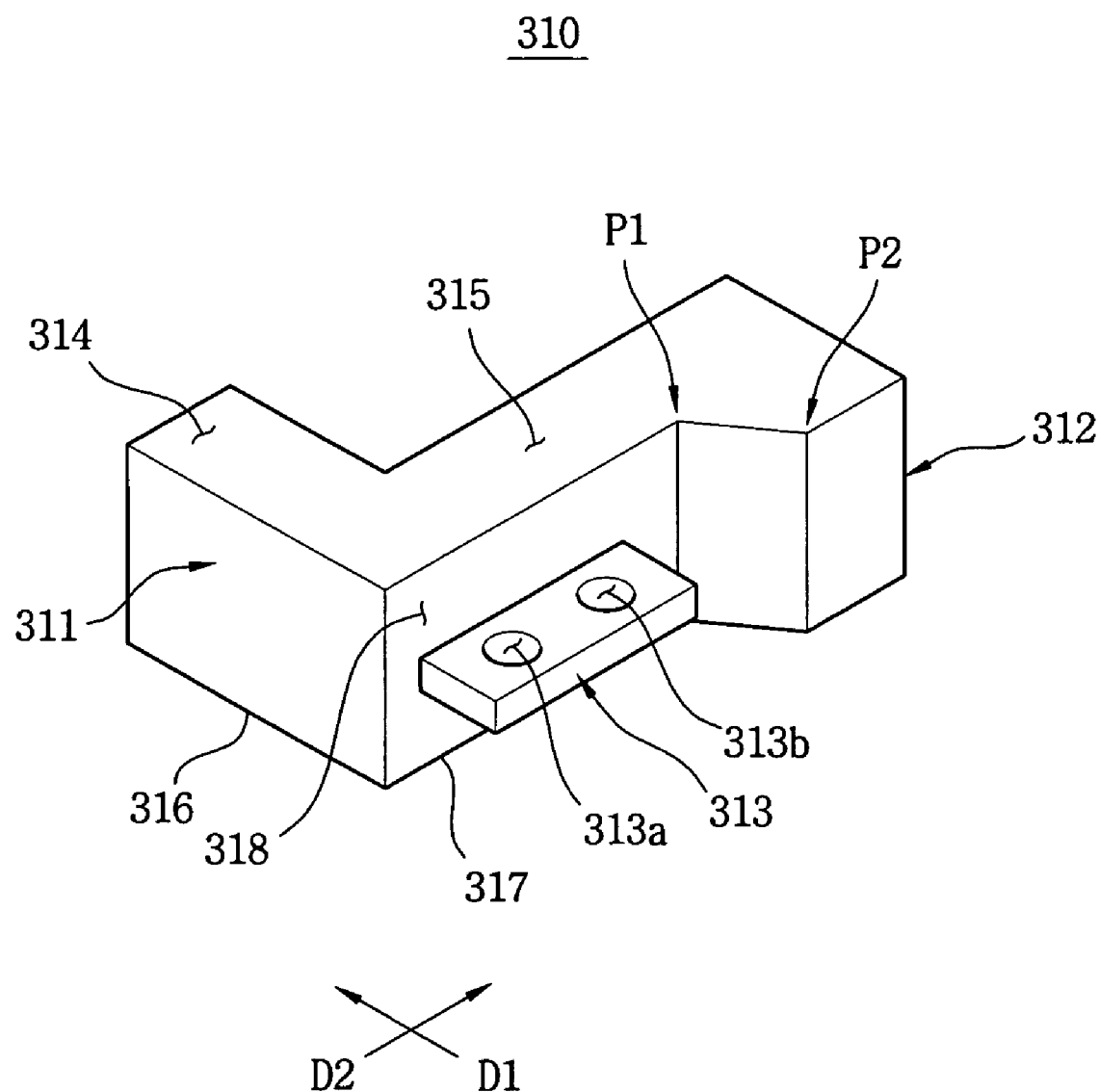
FIG. 3 is a perspective view showing a first combing member of FIG. 1.

FIG. 3 is a perspective view showing a first combing member of FIG. 1.

Referring to FIG. 3, a first combining member 310 includes first and second body portions 311 and 312. The first body portion 311 extends in a first direction D1, and the second body portion 312 is bent from the first body portion 311 to extend in a second direction D2 that is substantially perpendicular to the first direction D1, so that the first combining member 310 has an L-shape. The first and second directions D1 and D2 are substantially in parallel with the first and second sidewalls 272 and 273, respectively.

The first and second body portions 311 and 312 have a polyhedron shape, and the second body portion 312 has an increasing thickness from a point P1 to a point P2. The second body portion 312 has a uniform thickness from the point P2 to the end.

When the bottom chassis 270 receives the first combining member 310, lower faces 316 and 317 of the first and second body portions 311 and 312 make contact with the bottom plate 271. The first body portion 311 makes contact with the first sidewall 272, and the second body portion 312 makes contact with the second sidewall 273.

The first combining member 310 has a first combining portion 313 protruding from a side face 318 of the second body portion 312. The first combining portion 313 is spaced apart from upper and lower faces 315 and 317 of the second body portion 312. That is, the first combining portion 313 is formed at a center of the side face 318 of the second body portion 312. The first combining portion 313 includes a first hole 313a and a first fixing hole 313b.

Referring to FIGS. 1 to 3, the first to fourth combining members 310, 320, 330 and 340 are thicker than the bottom chassis 270. Further, the first to fourth combining members 310, 320, 330, and 340 are stronger than the bottom chassis 270. Thus, even when the liquid crystal display module 600 becomes larger, the first to fourth combining members 310, 320, 330 and 340 are not deformed to support the liquid crystal display module 600.

In FIGS. 1 to 3, the first to fourth combining members 310, 320, 330 and 340 have, for example, an identical shape or symmetrical shape. However, the first to fourth combining members 310, 320, 330 and 340 may have different shape with each other. For example, a combining portion may be formed at different positions, and the combining portion may include a different number of holes.

Figure 4:
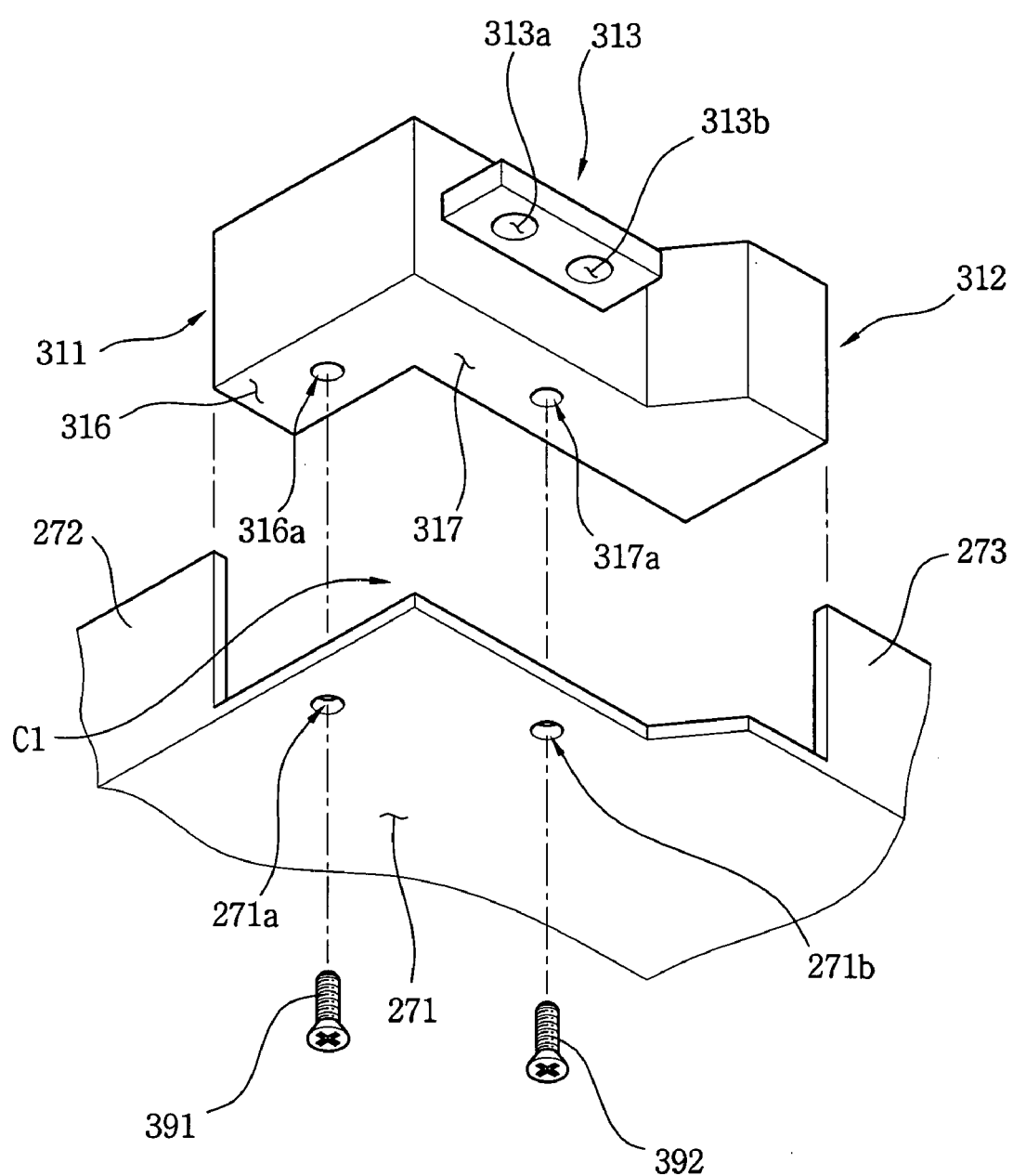
FIG. 4 is an exploded perspective view showing a combination structure of a bottom chassis and a first combining member.

FIG. 4 is an exploded perspective view showing a combination structure of a bottom chassis and a first combining member. In FIG. 4, only a combination of a first combining member and a bottom chassis is disclosed. However, a combination structure of second to fourth combining members and the bottom chassis is same as the combination of the first combining member and the bottom chassis, so any further explanation of the combination structures of the second to fourth combining members and the bottom chassis will be omitted.

Referring to FIG. 4, the bottom chassis 270 includes first and second connection holes 271a and 271b formed through the bottom plate 271. The first and second connection holes 271a and 271b are disposed at a first corner C1 of the bottom chassis 270. The first combining member includes first and second connection grooves 316a and 317a formed at first and second body portions 311 and 312, respectively. The first and second connection grooves 316a and 317a correspond to the first and second connection holes 271a and 271b of the bottom chassis 270, respectively.

When the first combining member 310 is disposed at the first corner C1 of the bottom chassis 270, first and second screws 391 and 392 combine the first combining member 310 to the bottom chassis 270 via the first connection hole 271a and the first connection groove 316a, and via the second connection hole 271b and the second connection groove 317a, respectively.

Figure 5:
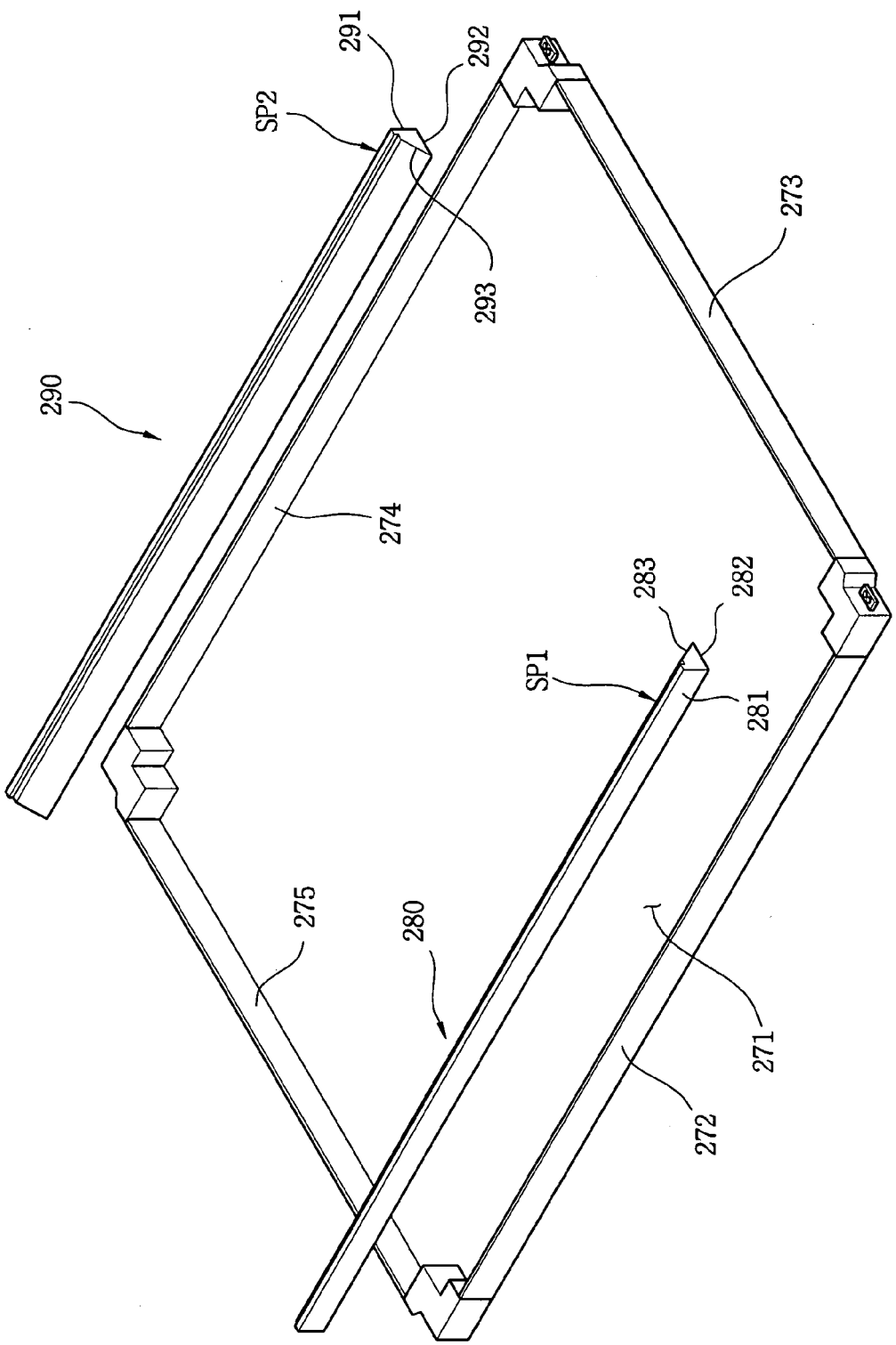
FIG. 5 is an exploded perspective view showing a combination structure of a bottom chassis and a second mold bar.

FIG. 5 is an exploded perspective view showing a combination structure of a bottom chassis and a second mold bar.

Referring to FIG. 5, a first mold bar 280 having a rod shape is extended in a first direction. The first mold bar 280 includes first and second faces 281 and 282. The first face 281 is in parallel with a first sidewall 272 of the bottom chassis 270, and the second face 282 is in parallel with a bottom plate 271 of the bottom chassis 270. The first and second faces 281 and 282 form a right angle. Thus, when the bottom chassis 270 receives the first mold bar 280, the first and second faces 281 and 282 make contact with the first sidewall 272 and the bottom plate 271, respectively.

The first mold bar 280 further includes a third face 283 that is inclined with respect to the bottom plate 271. A first stepped portion SP1 is formed at a combining member between the first and third faces 281 and 283. The optical sheets 223 and the diffusion plate 221 of FIG. 1 are disposed on the first stepped portion SP1.

The second mold bar 290 has an identical shape with the first mold bar 280. That is, the second mold bar 290 includes fourth and fifth faces 291 and 292. The fourth face 291 is in parallel with a third sidewall 274 of the bottom chassis 270, and the fifth face 292 is in parallel with a bottom plate 271 of the bottom chassis 270. The fourth and fifth faces 291 and 292 form a right angle. Thus, when the bottom chassis 270 receives the second mold bar 290, the fourth and fifth faces 291 and 292 make contact with the third sidewall 274 and the bottom plate 271, respectively.

The second mold bar 290 further includes a sixth face 293 that is inclined with respect to the bottom plate 271. A second stepped portion SP2 is formed at a combining member between the fourth and sixth faces 291 and 293. The optical sheets 223 and the diffusion plate 221 of FIG. 1 are disposed on the first stepped portion SP1.

Figure 6:
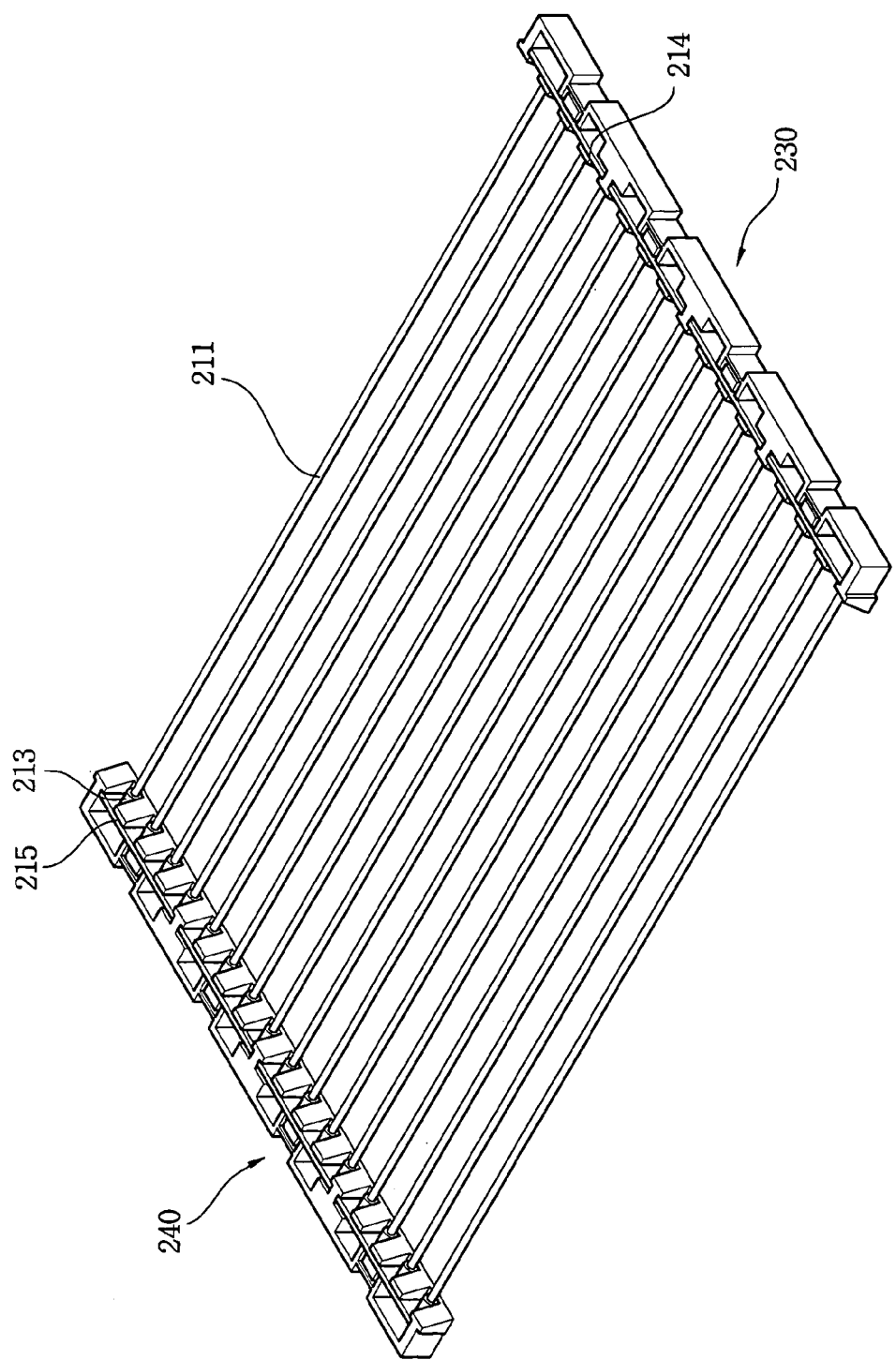
FIG. 6 is a perspective view showing a combination structure of first and second lower molds and a lamp unit.
Figure 7:
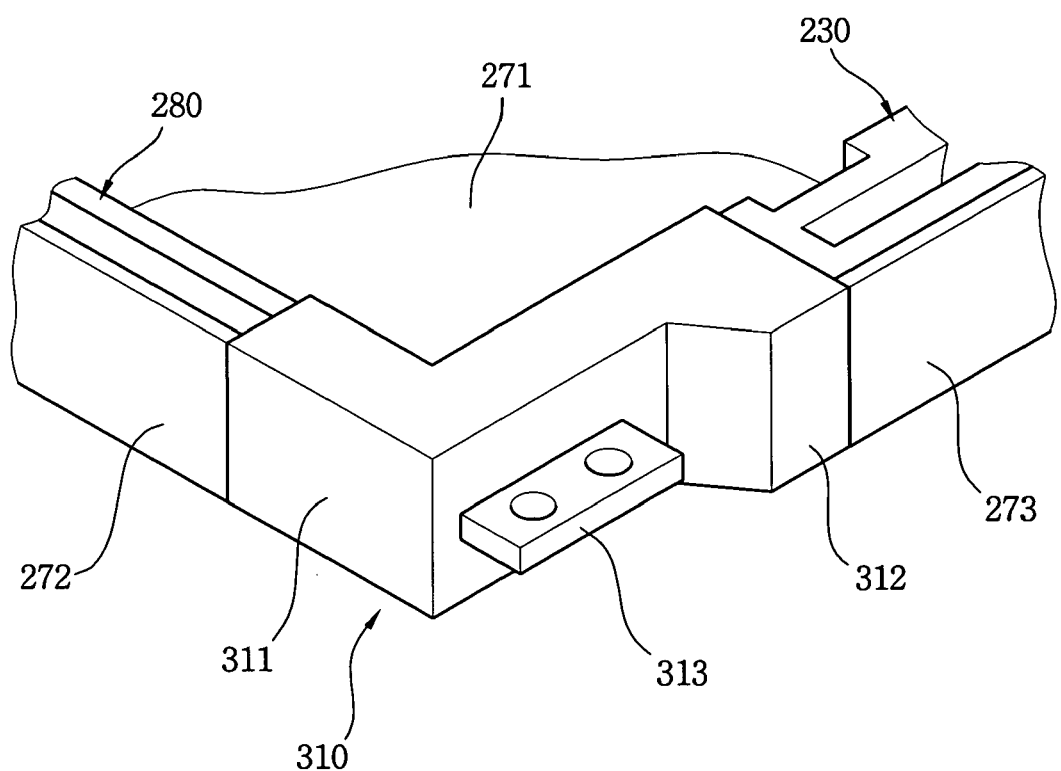
FIG. 7 is a partially cut out perspective view showing a combination structure of a first lower mold and a bottom chassis.

FIG. 6 is a perspective view showing a combination structure of first and second lower molds and a lamp unit, and FIG. 7 is a partially cut out perspective view showing a combination structure of a first lower mold and a bottom chassis.

Referring to FIG. 6, a lamp unit 210 includes a plurality of lamps 211, a first holder (not shown) and a second lamp holder 213. The lamps 211 for generating a light are disposed in parallel with each other. The first and second lamp holders disposed at each end of the lamps 211 are connected to each end of the lamps 211.

The lamp unit 210 further includes first and second circuit boards 214 and 215. The first circuit board 214 is electrically connected to first ends of four lamps, so that a first driving voltage is applied to the first ends of the four lamps. The second circuit board 215 is electrically connected to second ends of the four lamps, so that a second driving voltage that is different from the first driving voltage is applied to the second ends of the four lamps.

First and second lower molds 230 and 240 are disposed at the first and second end portions of the lamps 211, respectively. The first lower mold 230 receives a plurality of the first circuit boards 214 and the first end portions of the lamps 211, and the second lower mold 240 receives a plurality of the second circuit boards 215 and second ends of the second end portions of the lamps 211.

As shown in FIG. 7, the bottom chassis 270 receives the first lower mold 230, such that the first lower mold 230 makes contact with the bottom plate 271 and the second sidewall 273. The first lower mold 230 is disposed, such that one end of the first lower mold 230 is adjacent to the second body portion 312 of the first combining member 310 disposed at the first corner C1 of the bottom chassis 270.

In FIG. 6, the first and second circuit boards 214 and 215 are connected to each end of the lamps 211, respectively. However, when the lamps 211 correspond to an external electrode type lamp, first and second conductive clips (not shown) may be connected to the lamps instead of the first and second circuit boards 214 and 215. The first and second conductive clips are electrically connected to a lamp drive circuit board (not shown) to apply the first and second driving voltages to the lamps 211.

Figure 8:
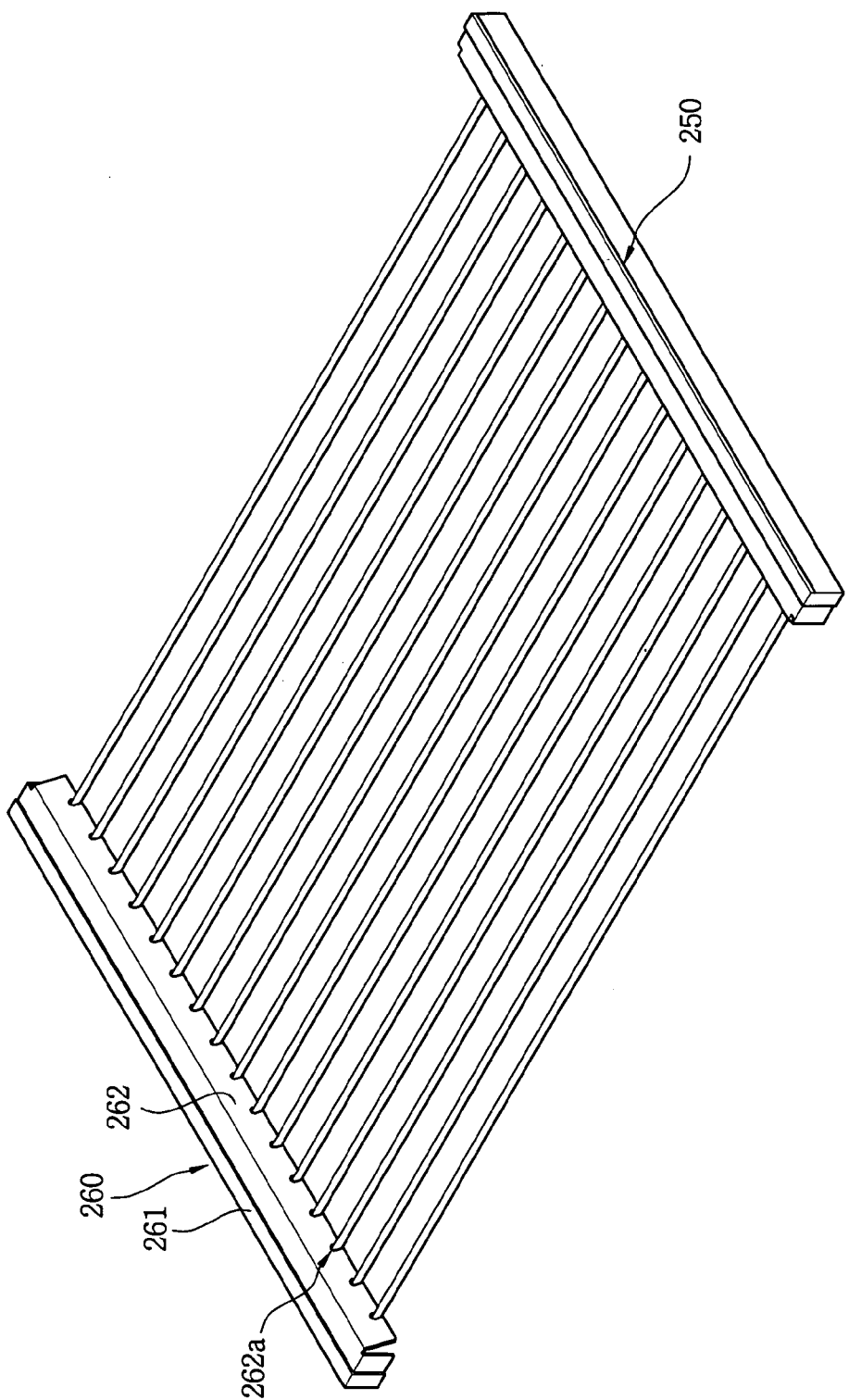
FIG. 8 is a perspective view showing a combination structure of first and second upper molds and first and second lower molds.
Figure 9:
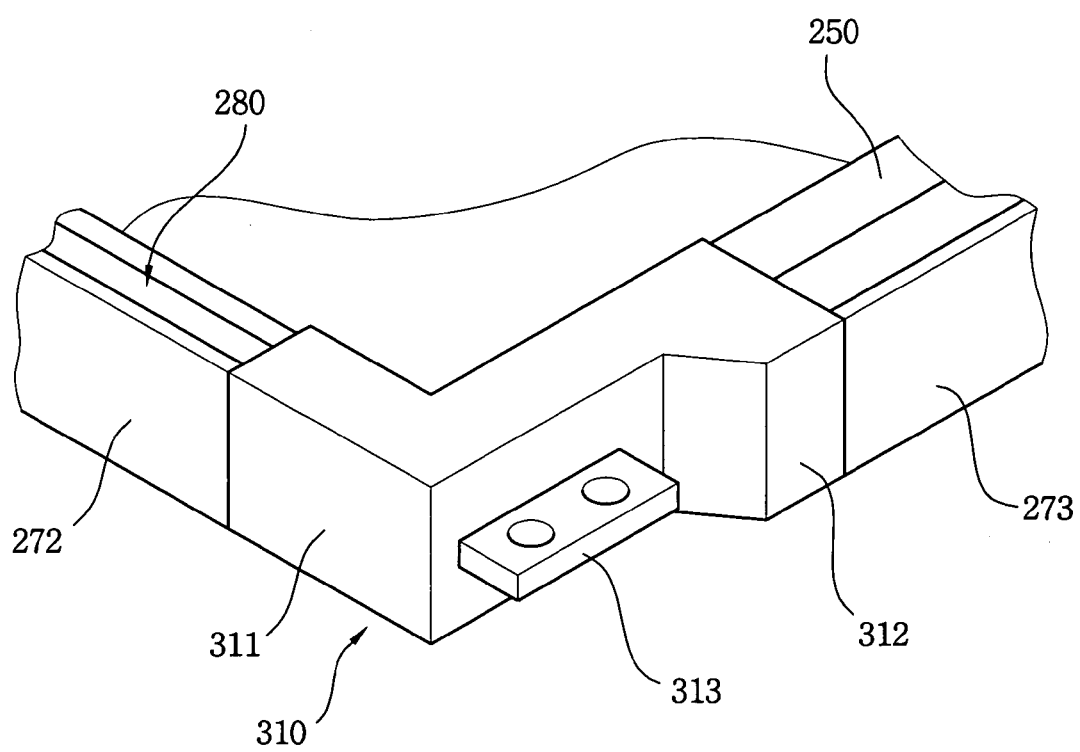
FIG. 9 is a partially cut out perspective view showing a combination structure of a first upper mold and a bottom chassis.

FIG. 8 is a perspective view showing a combination structure of first and second upper molds and first and second lower molds, and FIG. 9 is a partially cut out perspective view showing a combination structure of a first upper mold and a bottom chassis.

Referring to FIG. 8, a first upper mold 250 is combined with a first lower mold 230 to cover first ends of lamps 211, and a second upper mold 260 is combined with a second lower mold 240 to cover second ends of the lamps 211.

The first and second upper molds 250 and 260 have an identical shape with each other. Thus, any further explanations of the first upper mold 250 will be omitted.

The second mold 260 includes third and fourth cover faces 261 and 262. The third cover face 261 is in parallel with the bottom plate 271. The fourth cover face 262 is extended from the third cover face 261, such that the fourth cover face 262 forms an angle with respect to the bottom plate 271.

The third cover face 261 has a step shape, and disposed on the lower mold 240. The optical sheets 223 and a diffusion plate 221 are disposed on the third cover face 261. The fourth cover face 262 includes a second receiving groove 262a for receiving the second end portion of the lamps 211.

As shown in FIG. 9, the first upper mold 250 is combined with the first lower mold 230 received by the bottom chassis 270, and one end of the first upper mold is disposed adjacent to the second body portion 312 of the first combining member 310 disposed at the first corner C1.

Figure 10:
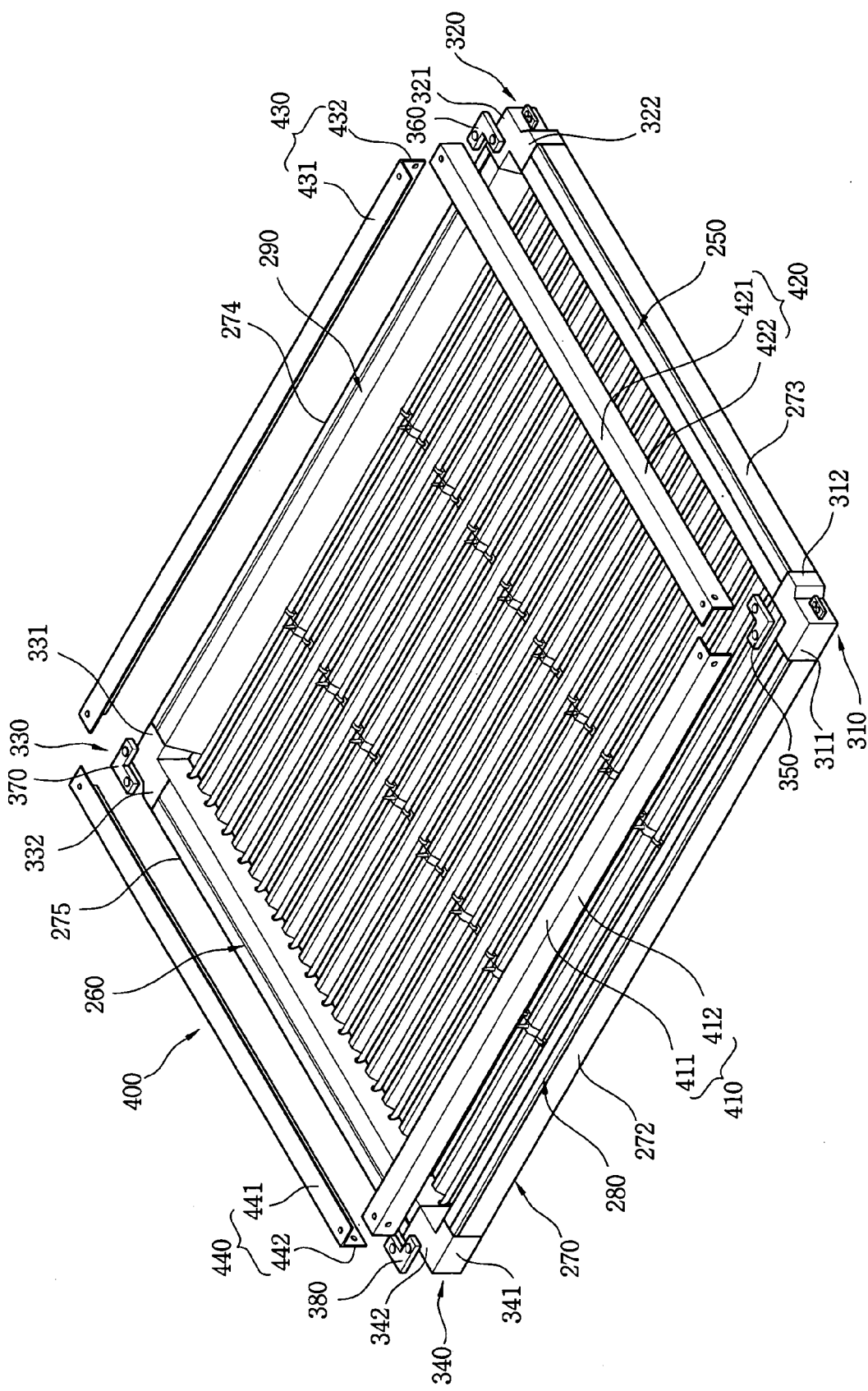
FIG. 10 is an exploded perspective view showing a middle chassis.
Figure 11A:
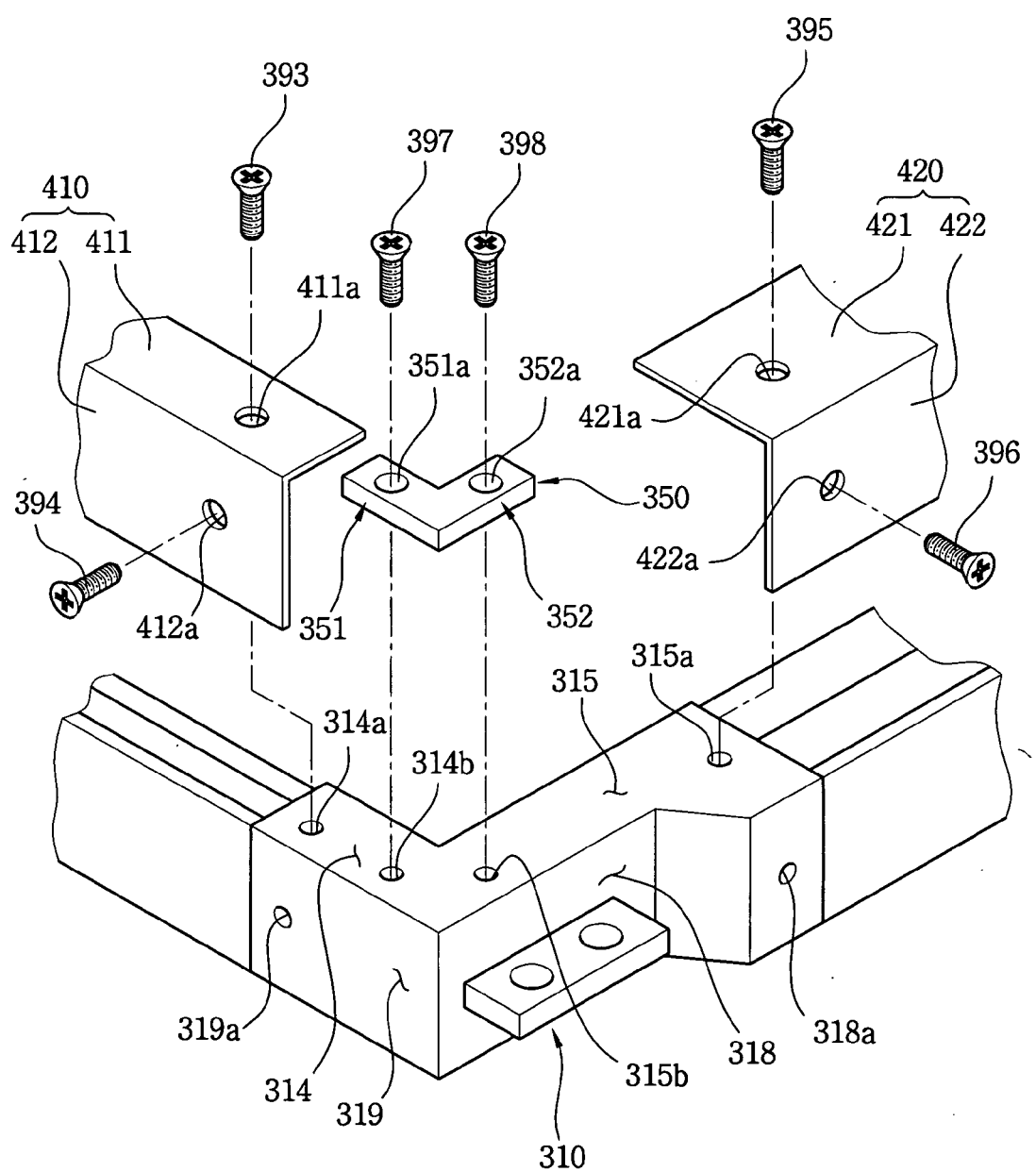
FIG. 11A is an exploded perspective view showing a combination structure of first and second middle chassis and a first combining member, and a combination structure of first support member and a first combining member.
Figure 11B:
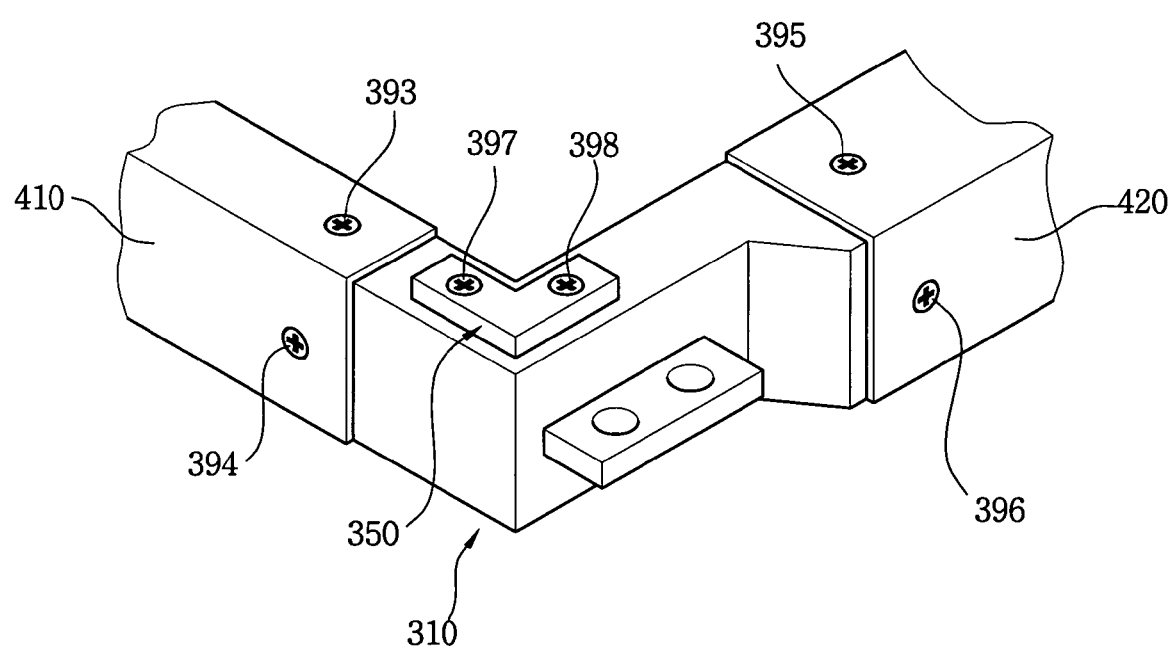
FIG. 11B is a perspective view showing a combination structure of first and second middle chassis and a first combining member, and a combination structure of first support member and a first combining member.

FIG. 10 is an exploded perspective view showing a middle chassis, FIG. 11A is an exploded perspective view showing a combination structure of first and second middle chassis and a first combining member, and a combination structure of first support member and a first combining member, and FIG. 11B is a perspective view showing a combination structure of first and second middle chassis and a first combining member, and a combination structure of first support member and a first combining member.

Referring to FIG. 10, a middle chassis 400 includes first to fourth chassis pieces 410, 420, 430 and 440.

The first chassis piece 410 extends in the first direction as the first sidewall 272 of the bottom chassis 270. The first chassis piece 410 includes a first upper face 411 and a fifth side face 412. The first upper face 411 covers the first sidewall 272 and the first mold bar 280. The fifth side face 412 is bent from the first upper face 411, so that the fifth side face 412 makes contact with the first sidewall 272. A first end portion of the first chassis piece 410 overlaps with the first body portion 311 of the first combining member 310, and a second end portion of the first chassis piece 410 overlaps with the first body portion 341 of the fourth combining member 340.

The second chassis piece 420 is extended in the second direction as the second sidewall 273 of the bottom chassis 270. The second chassis piece 420 includes a second upper face 421 and a sixth side face 422. The second upper face 421 covers the second sidewall 273 and the first upper mold 250. The sixth side face 422 is bent from the second upper face 421, so that the sixth side face 422 makes contact with the second sidewall 273. A first end portion of the second chassis piece 420 overlaps with the second body portion 322 of the second combining member 320, and a second end portion of the second chassis piece 420 overlaps with the second body portion 312 of the first combining member 310.

The third chassis piece 430 is extended in the first direction as the third sidewall 274 of the bottom chassis 270. The third chassis piece 430 includes a third upper face 431 and a seventh side face 432. The third upper face 431 covers the third sidewall 274 and the second mold bar 290. The seventh side face 432 is bent from the third upper face 431, so that the seventh side face 432 makes contact with the third sidewall 274. A first end portion of the third chassis piece 430 overlaps with the first body portion 331 of the third combining member 330, and a second end portion of the third chassis piece 430 overlaps with the first body portion 321 of the second combining member 320.

The fourth chassis piece 440 is extended in the second direction as the fourth sidewall 275 of the bottom chassis 270. The fourth chassis piece 440 includes a fourth upper face 441 and an eighth side face 442. The fourth upper face 441 covers the fourth sidewall 275 and the second upper mold 260. The eighth side face 442 is bent from the fourth upper face 441, so that the eighth side face 442 makes contact with the fourth sidewall 275. A first end portion of the fourth chassis piece 440 overlaps with the second body portion 342 of the fourth combining member 340, and a second end portion of the fourth chassis piece 440 overlaps with the second body portion 332 of the third combining member 330.

The first to fourth combining members 310, 320, 330 and 340 combined with the bottom chassis 270 support first to fourth support members 350, 360, 370 and 380. That is, the first to fourth support members 350, 360, 370 and 380 are disposed on the first to fourth combining members 310, 320, 330 and 340 combined with the bottom chassis 270.

The first to fourth support members 350, 360, 370 and 380 guide the liquid crystal display panel 110.

The first to fourth support members 350, 360, 370 and 380 have thinner thickness than the first to fourth chassis pieces 410, 420, 430 and 440. Thus, the first to fourth support members 350, 360, 370 and 380 may support the liquid crystal display panel 110 disposed over the first to fourth chassis pieces 410, 420, 430 and 440.

Referring to FIG. 11A, the first chassis piece 410 includes third and fourth connection holes 411a and 412a. The third connection hole 411a penetrates the second upper face 421, and the fourth connection hole 412a penetrates the fifth side face 412. The first body portion 311 includes a third connection groove 314a corresponding to the third connection hole 411a, and a fourth connection groove 319a corresponding to the fourth connection hole 412a. Thus, the third connection groove 314a is formed at an upper face 314 of the first body portion 311, and the fourth connection groove 319a is formed at a side face 319 of the first body portion 311.

The second chassis portion 420 includes fifth and sixth connection holes 421a and 422a. The fifth connection hole 421a penetrates the second upper face 421, and the sixth connection hole 422a penetrates the sixth side face 422. The second body portion 312 includes fifth and sixth connection grooves 315a and 318a corresponding to the fifth and sixth connection holes 315a and 422a, respectively. Thus, the fifth connection groove 315a is formed at upper face 315 of the second body portion 312, and the sixth connection groove 318a is formed at side surface 318 of the second body portion 312.

The first supporting member 350 is disposed on the first combining member 310. The first supporting member 350 includes first and second supporting portions 351 and 352. The first supporting portion 351 is in parallel with the first body portion 311, and the second supporting portion 352 is bent from the first supporting portion 311 to form an L-shape, so that the second supporting portion 352 is in parallel with the second body portion 312.

The first supporting member 350 includes seventh and eighth connection holes 351a and 352a. The seventh connection hole 351a penetrates the first supporting part 351, and the eighth connection hole 352a penetrates the second supporting part 352.

The first body portion 311 includes a seventh connection groove 314b formed at the upper surface 314 of the first body portion 311. The seventh connection groove 314b corresponds to the seventh connection hole 351a.

The second body portion 312 includes an eighth connection groove 315b formed at the upper surface 315 of the second body portion 312. The eighth connection groove 315b corresponds to the eighth connection hole 352a.

As shown in FIGS. 11A and 11B, a third screw 393 passes through the third connection hole 411a and reaches the third connection groove 314a, and a fourth screw 394 passes through the fourth connection hole 412a and reaches the fourth connection groove 319a to combine the first chassis piece 410 to the first combining member 310.

A fifth screw 395 passes through the fifth connection hole 421a and reaches the fifth connection groove 315a, and a sixth screw 396 passes through the sixth connection hole 422a and reaches the sixth connection groove 318a to combine the second chassis piece 420 to the first combining member 310.

A seventh screw 397 penetrates the seventh connection hole 351a and reaches the seventh groove 314b, and an eighth screw 398 penetrates the eighth connection hole 352a and reaches the eighth connection 315b to combine the first supporting member 350 to the first combining member 310.

In FIGS. 10 to 11B, the middle chassis 400 is divided into four pieces. However, the middle chassis 400 may be divided into two or three pieces.

The first to fourth chassis pieces 410, 420, 430 and 440 are formed separately, and the first to fourth chassis pieces 410, 420, 430 and 440 are assembled together to form the middle chassis 400 to make a process easier. Furthermore, a distortion that occurs during manufacturing process is reduced.

Figure 12A:
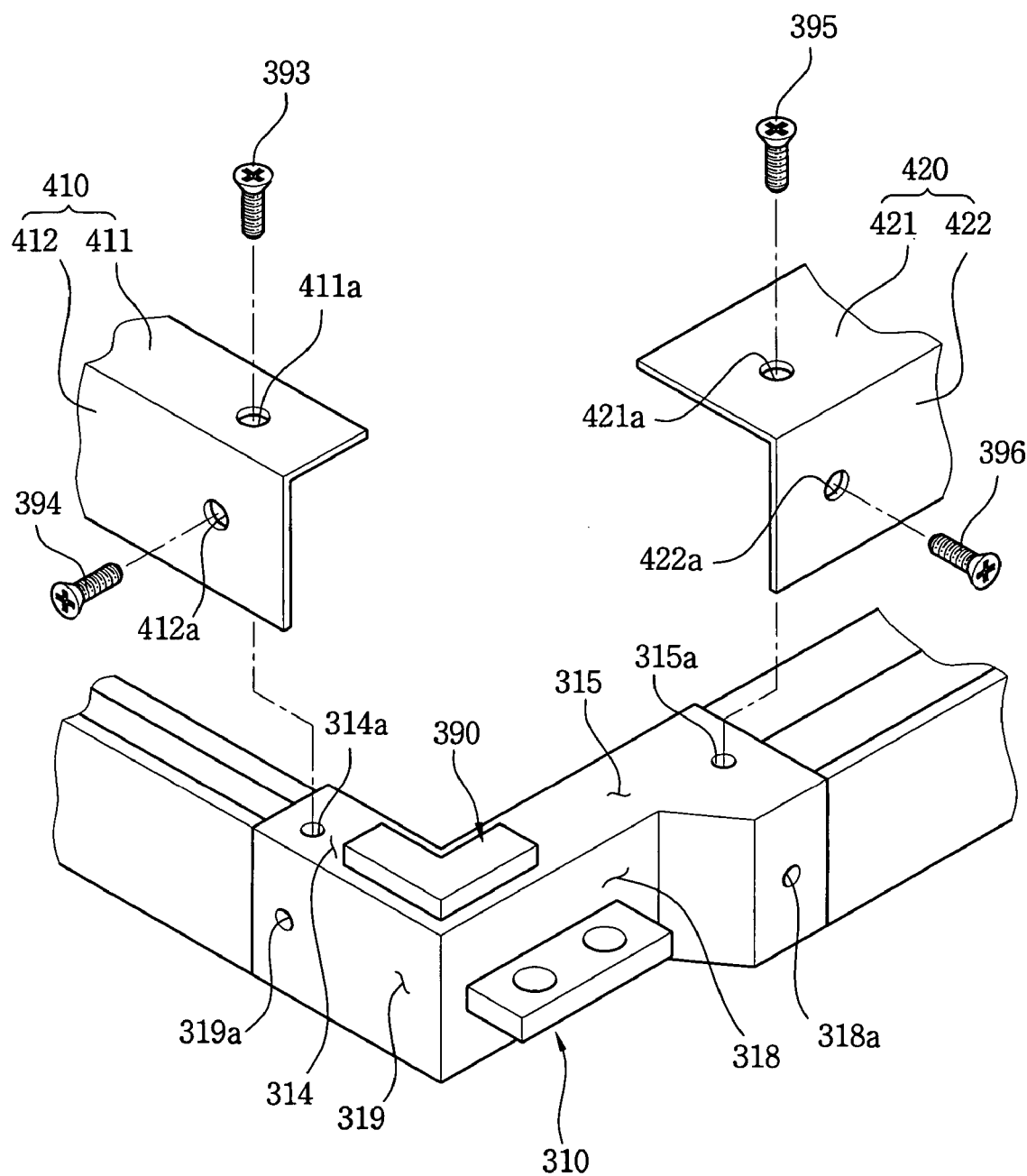
FIG. 12A is an exploded perspective view showing a first support member integrally formed with a first combining member.
Figure 12B:
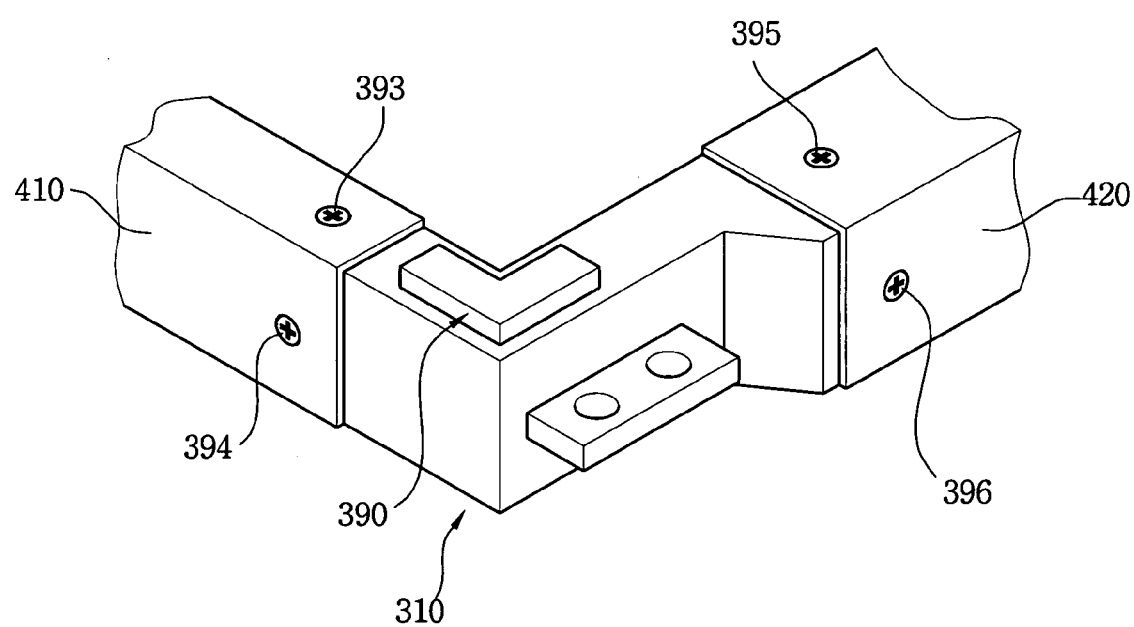
FIG. 12B is a perspective view showing a first support member integrally formed with a first combining member.

FIG. 12A is an exploded perspective view showing a first support member integrally formed with a first combining member, and FIG. 12B is a perspective view showing a first support member integrally formed with a first combining member.

Referring to FIGS. 12A and 12B, a first supporting member 390 protrudes upwardly from the first combining portion 310. A height of the first supporting member 390 is larger than a thickness of the first and second chassis pieces 410 and 420.

Further, the first supporting member 390 has an L-shape.

When the first supporting member 390 is integrally formed with the first combining member 310, a screw for combing the first supporting member 390 and the first combining member 310 is not required. Thus, a number of assembling processes is reduced.

FIG. 13 is a perspective view showing a top chassis of FIG. 1, and FIG. 14 is a plan view showing a top chassis of FIG. 13.

Referring to FIGS. 13 and 14, a top chassis 500 includes an upper face 510 and ninth to twelfth side faces 520, 530, 540 and 550.

When the top chassis 500 is disposed on the liquid crystal display panel 110, the upper face 510 covers a non-effective display region of the liquid crystal display panel 110, and the ninth to twelfth side faces 520, 530, 540 and 550 make contact with fifth to eight side faces 412, 422, 432 and 442 of the first to fourth chassis pieces 410, 420, 430 and 440.

The top chassis 500 further includes fifth to eighth combining portions 560, 570, 580 and 590 at fifth to eighth corners C5, C6, C7 and C8 of the top chassis 500, respectively.

The upper surface 510 is extended at the fifth corner C5 to form a fifth extending portion. The fifth extending portion is bent down and then bent outward again to form the fifth combining portion 560. The upper surface 510 is extended at the sixth corner C6 to form a sixth extending portion. The sixth extending portion is bent down and then bent outward again to form the sixth combining member 570. The upper surface 510 is extended at the seventh corner C7 to form a seventh extending portion. The seventh extending portion is bent down and then bent outward again to form the seventh combining member 580. The upper surface 510 is extended at the eighth corner C8 to form an eighth extending portion. The eighth extending portion is bent down and then bent outward again to form the eighth combining member 590.

The fifth to eight combining portions 560, 570, 580 and 590 correspond to first to fourth combining portions 313, 323, 333 and 343 of the first to fourth combining members 310, 320, 330 and 340.

The fifth to eight combining portions 560, 570, 580 and 590 have an identical shape with each other. Thus, sixth to eighth combining members 570, 580, and 590 will be omitted.

Figure 15:
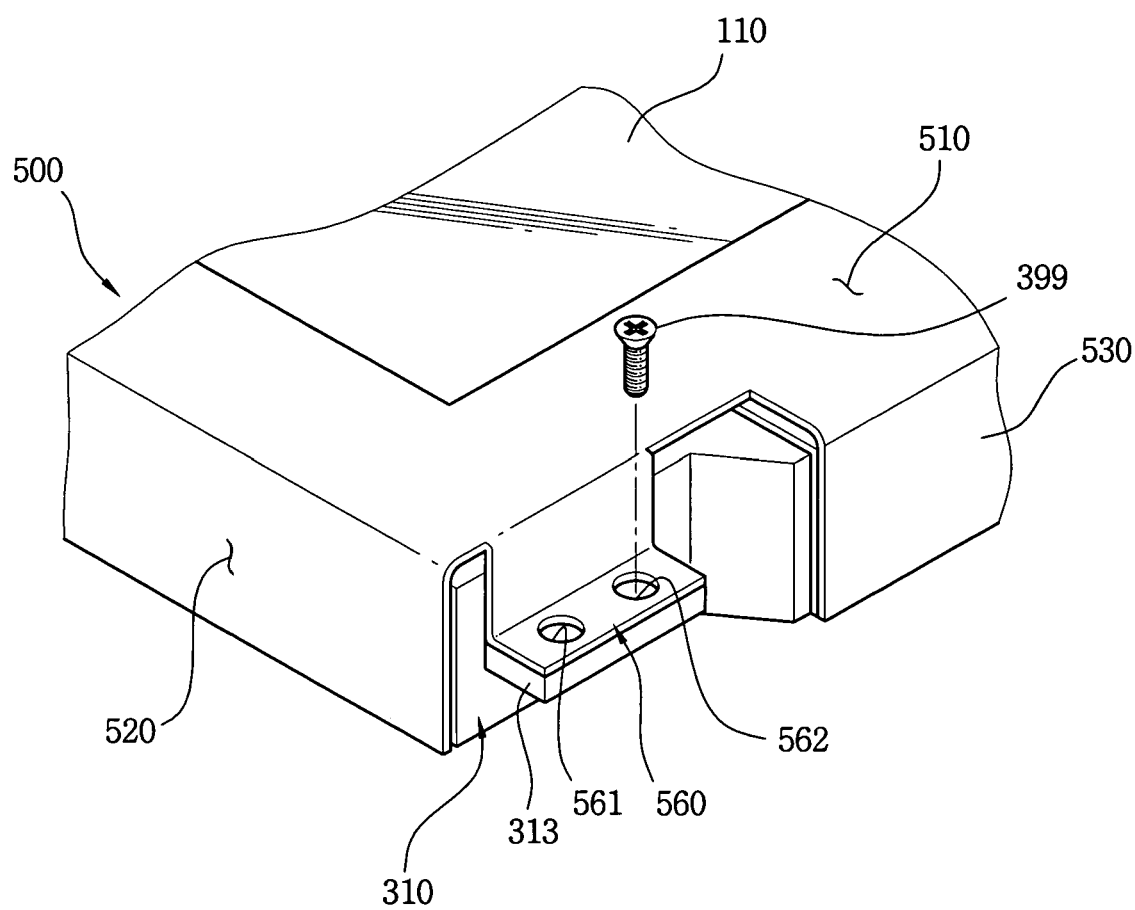
FIG. 15 is a partially cut out perspective view showing a combination structure of a top chassis and a first combining member.

FIG. 15 is a partially cut out perspective view showing a combination structure of a top chassis and a first combining member.

Referring to FIGS. 3 and 15, the top chassis 500 includes a second hole 561 and a second fixing hole 562. The second hole 561 and the second fixing hole 562 penetrate a fifth combining portion 560. When the top chassis 500 is disposed on a liquid crystal display panel 110, an upper face 510 covers the liquid crystal display panel 110, a ninth side face 520 of the top chassis 500 makes contact with a fifth side face 412 of a first chassis piece 410, and a tenth side face of the top chassis 500 makes contact with a sixth side face 422 of a second chassis piece 420.

The second hole 561 and the second fixing hole 562 correspond to a first hole 313a and a first fixing hole 313b of a first combining portion 313. A ninth screw 399 penetrates second and first fixing holes 562 and 313b in sequence to combine the top chassis 599 to the bottom chassis 270. Then, a liquid crystal display module 600 is completed.

In FIGS. 13 to 15, the fifth to eighth combining portions 560, 570, 580 and 590 have, for example, an identical shape. However, the fifth to eighth combining portions 560, 570, 580 and 590 may have different shape with each other according to a shape of first to fourth combining members 310, 320, 330 and 340.

Figure 16:
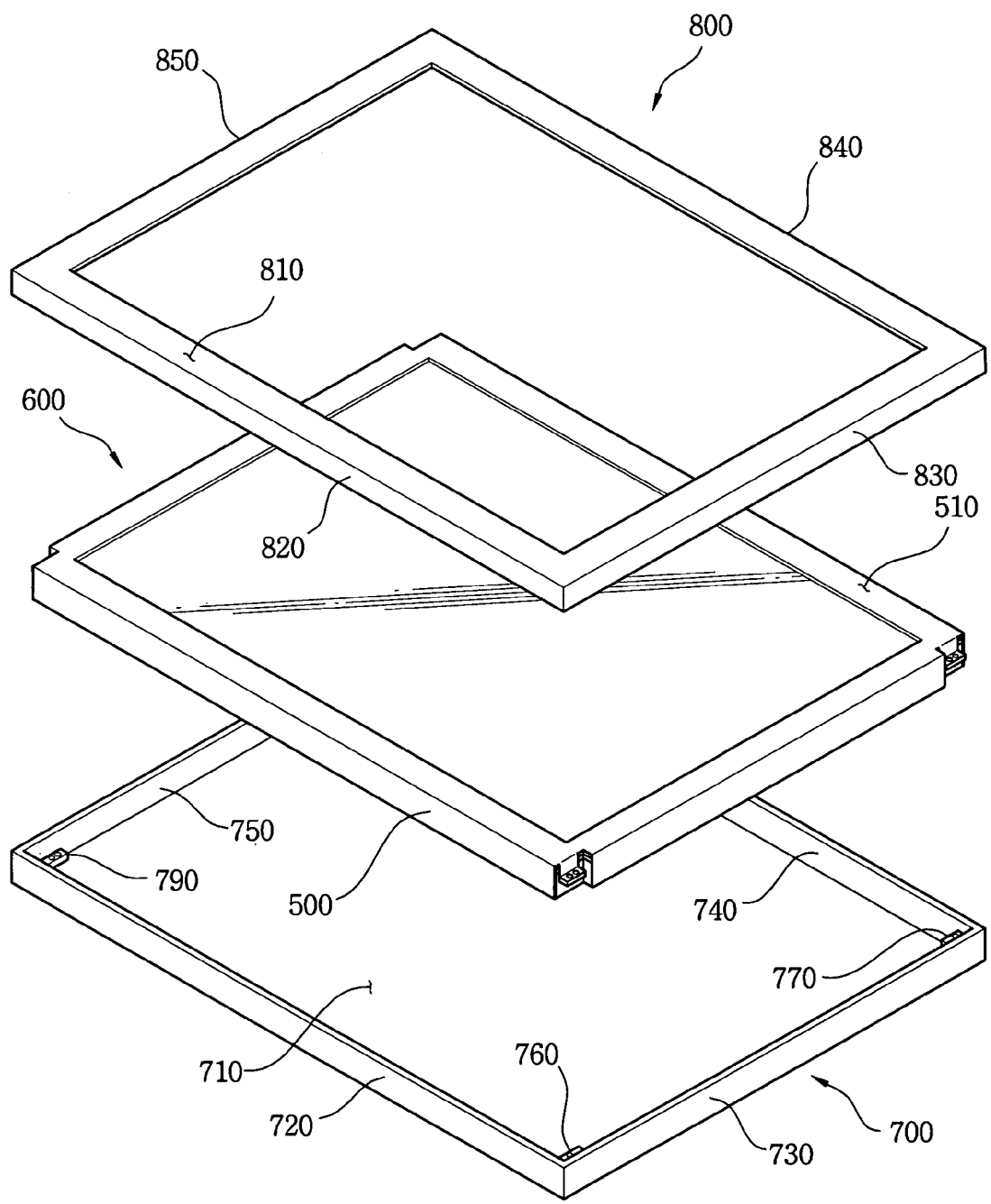
FIG. 16 is an exploded perspective view showing a liquid crystal display apparatus according to another exemplary embodiment of the present invention.
Figure 17:
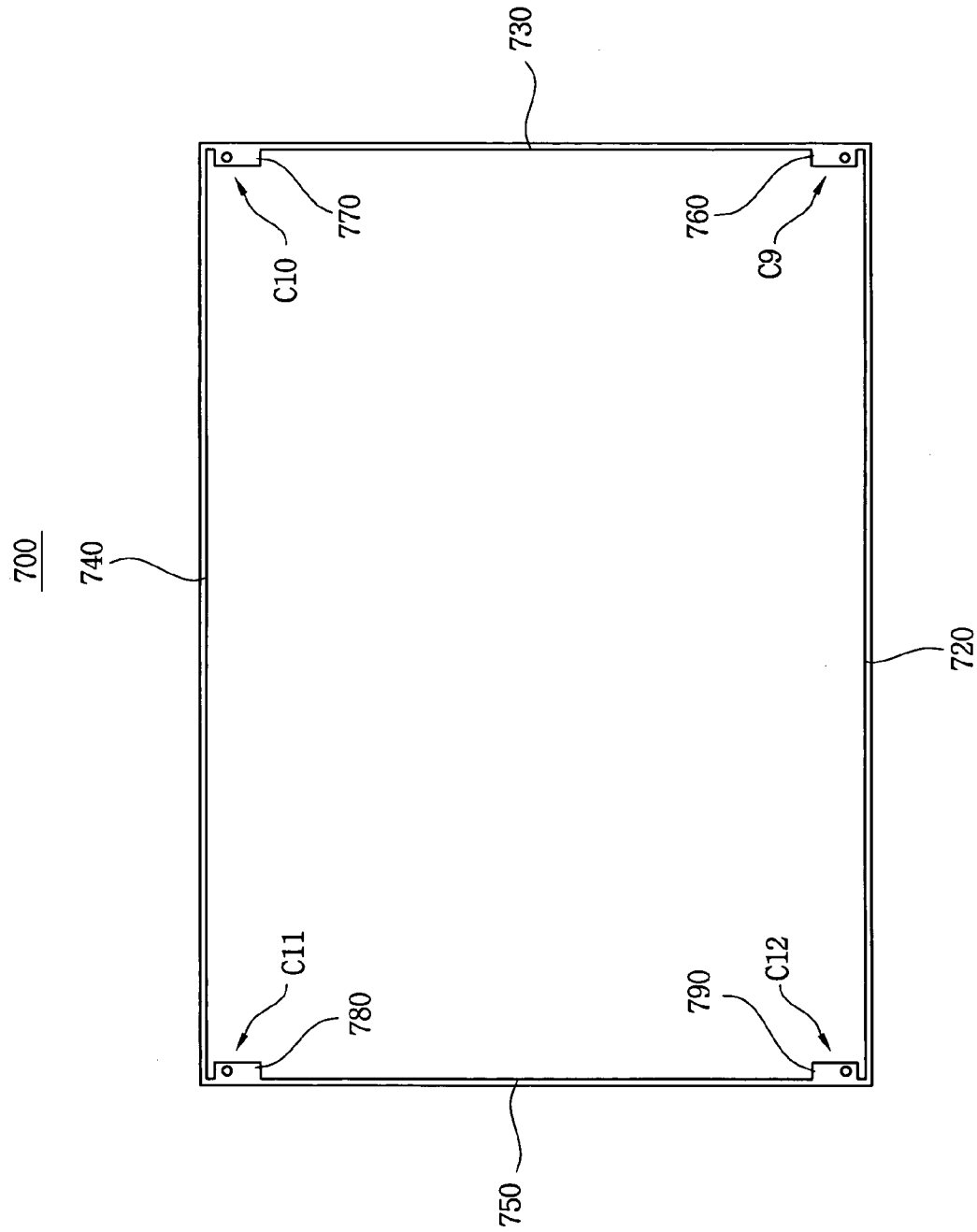
FIG. 17 is a plan view showing a rear case of FIG. 16.

FIG. 16 is an exploded perspective view showing a liquid crystal display apparatus according to another exemplary embodiment of the present invention, and FIG. 17 is a plan view showing a rear case of FIG. 16.

Referring to FIGS. 16 and 17, a liquid crystal display apparatus 900 includes a liquid crystal display module 600, a rear case 700 and a front case 800. The rear and front cases 700 and 800 protect the liquid crystal display module 600.

The rear case 700 includes a rear plate 710 and thirteenth to sixteenth sidewalls 720, 730, 740 and 750 extended from the rear plate 710. The rear plate 710 and the thirteenth to sixteenth sidewalls 720, 730, 740 and 750 define a receiving space for receiving the liquid crystal display module 600. The rear case 700 includes ninth to twelfth combining portions 760, 770, 780 and 790 disposed at ninth to twelfth corners C9, C10, C11 and C12, respectively. The ninth to twelfth combining portions 760, 770, 780 and 790 correspond to the first to fourth combining members 310, 320, 330 and 340 of the liquid crystal display module 600, respectively, and the ninth to twelfth combining portions 760, 770, 780 and 790 also correspond to fifth to eighth combining portions 560, 570, 580 and 590 of the top chassis 500, respectively.

The front case 800 includes a front plate 810 and seventeenth to twentieth sidewalls 820, 830, 840 and 850 extended from the front plate 810. The front case 800 combines with the rear case 700 receiving the liquid crystal display module 600. Thus, the front plate 810 faces the upper face 510 of the top chassis 500, and the seventeenth to twentieth sidewalls 820, 830, 840 and 850 face the thirteenth to sixteenth sidewalls 720, 730, 740 and 750 of the rear case, respectively.

Figure 18:
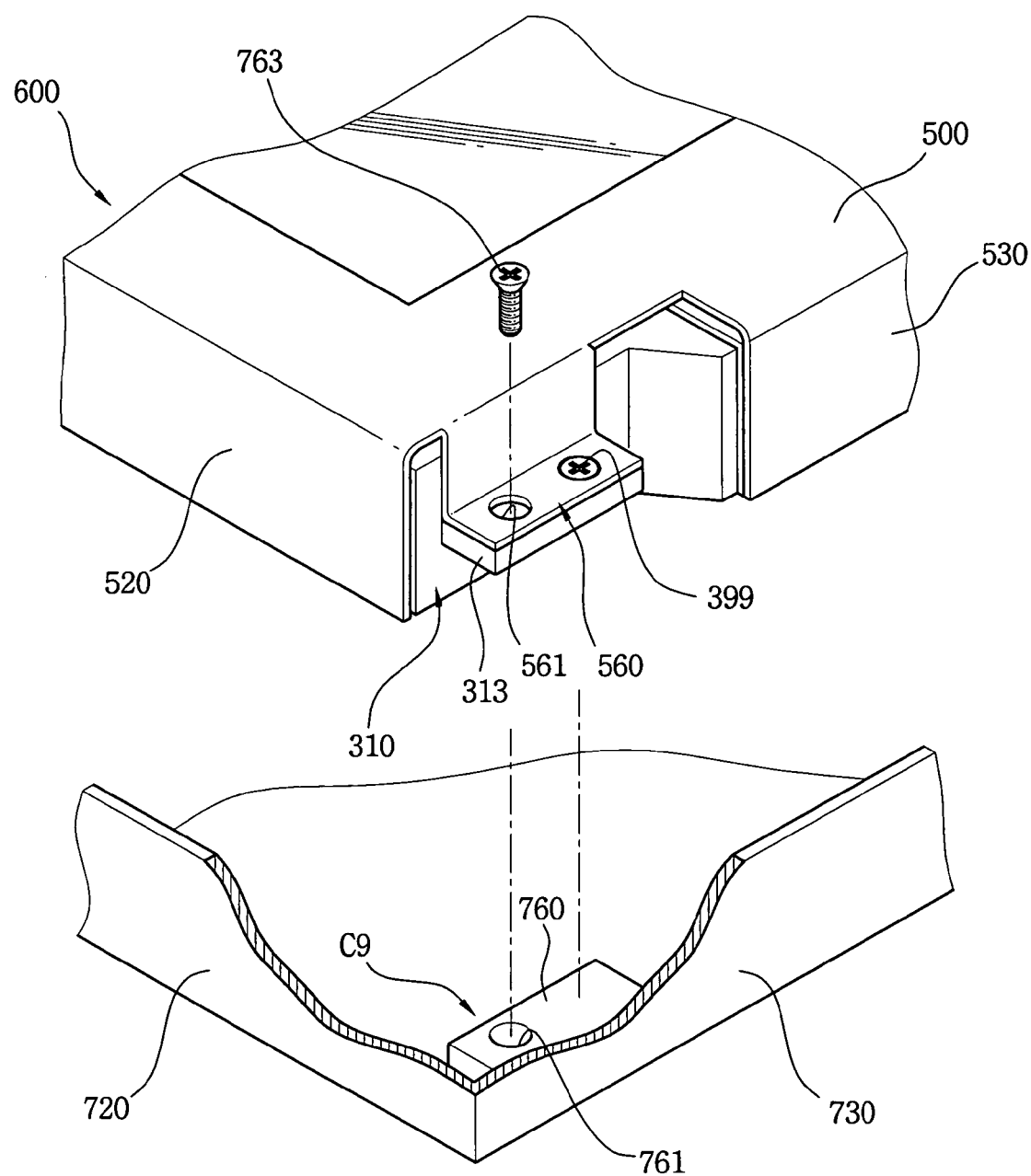
FIG. 18 is an exploded perspective view showing a combination structure of a liquid crystal display module and a rear case of FIG. 16.
Figure 19:
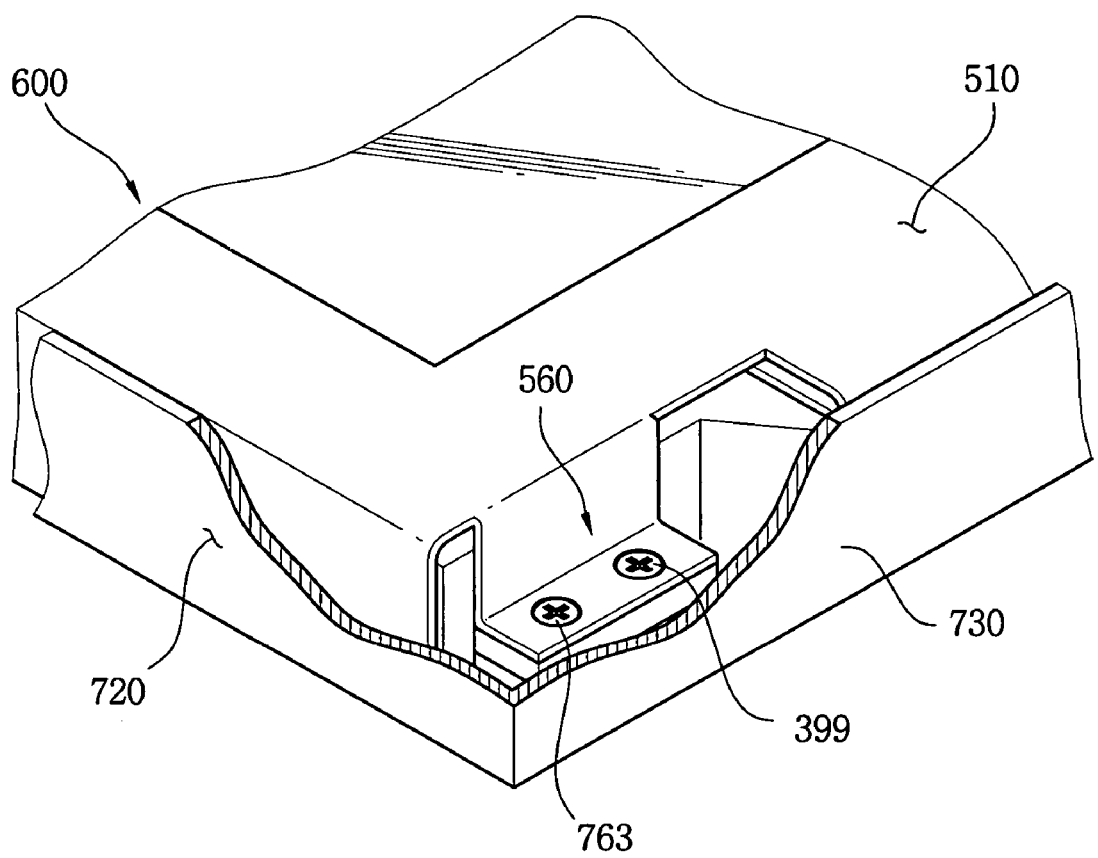
FIG. 19 is a perspective view showing a combination structure of a liquid crystal display module and a rear case of FIG. 16.

FIG. 18 is an exploded perspective view showing a combination structure of a liquid crystal display module and a rear case of FIG. 16, and FIG. 19 is a perspective view showing a combination structure of a liquid crystal display module and a rear case of FIG. 16. In FIGS. 18 and 19, only a combination structure of a ninth combining portions of a rear case and the liquid crystal display module is disclosed. However, a combination structure of tenth to twelfth combining portions and the liquid crystal display module is substantially same as the combination structure of the liquid crystal display module. Thus, an explanation of the combination structure of the tenth to twelfth combining portions of a rear case and the liquid crystal display module will be omitted.

Referring to FIGS. 18 and 19, a rear case 700 includes a ninth combining portion 760 disposed at a ninth corner C9. The ninth combining portion 760 protrudes from a rear plate 710, such that the ninth combining portion 760 is connected to the thirteenth sidewall 730. The ninth combining portion 760 includes a ninth connection groove 761.

The liquid crystal display module 600 includes a second hole 561 formed at the fifth combining portion 560, and a first hole 313a of a first combining member.

When the rear case 700 receives the liquid crystal display module 600, the first and second holes 313a and 561 correspond to the ninth connection groove 761. A ninth screw 763 penetrates the first and second holes 313a and 561 to reach the ninth connection groove 761 to combine the liquid crystal display module to the rear case 700.

According to a receiving unit, a display module having the receiving unit, and a display apparatus, a first hole is formed at a combining member, and the combining member is combined with the receiving member, such that the combining member is disposed at a corner of the receiving member. Additionally, a covering member combining with the receiving member includes a second hole corresponding to the first hole.

When the first hole is formed at the combining member that is stronger than the receiving member, a distortion of a connecting portion where the first hole is formed is prevented. Thus, quality of assembly components and coherence (or binding force) are enhanced.

The display apparatus adopts a receiving member divided into pieces. Thus, even when the display apparatus becomes larger, the receiving member may be manufactured easily thereby to enhance productivity.

Having described the exemplary embodiments of the present invention and its advantages, it is noted that various changes, substitutions and alterations can be made herein without departing from the spirit and scope of the invention as defined by appended claims.

What is claimed is:

1. A receiving unit that receives a display panel displaying an image and a lamp providing the display panel with a light, comprising:
   a receiving member that includes a bottom plate and a first sidewall that protrudes from an edge of the bottom plate;
   a combining member that is combined with the receiving member via connecting means, the combining member being separable from the receiving member, the combining member including a first hole; and
   a covering member that includes an upper plate and a second sidewall that protrudes from an edge of the upper plate, the covering member including a first combining portion that has a second hole corresponding to the first hole.

2. The receiving unit of claim 1, wherein the combining member comprises:
   a body portion disposed at a corner of the receiving member; and
   a second combining portion that protrudes outward from a side face of the body portion, the second combining portion including the first hole.

3. The receiving unit of claim 2, wherein the second combining portion is disposed between upper and lower surfaces of the body portion.

4. The receiving unit of claim 2, wherein the first sidewall at the corner is removed to expose the body portion and the second combining portion.

5. The receiving unit of claim 2, wherein the body portion is bent according to the corner of the bottom plate to form an L-shape.

6. The receiving unit of claim 2, wherein the first combining portion is disposed at a corner of the covering member, so that the first combining portion corresponds to the second combining portion.

7. The receiving unit of claim 2, further comprising a supporting member disposed on the body portion of the combining member.

8. The receiving unit of claim 7, wherein the supporting member is bent according to the corner of the bottom plate to form an L-shape.

9. The receiving unit of claim 7, wherein the supporting member is integrally formed with the combining member.

10. A display module comprising:
    a lamp that generates a light;
    a first receiving member that receives the lamp, the first receiving member including a first bottom plate and a first sidewall that protrudes upward from an edge of the bottom plate;
    a combining member that is combined with the first receiving member via connecting means, the combining member being separable from the receiving member, the combining member including a first hole;
    a display panel that displays an image by using the light generated from the lamp; and
    a covering member that includes an upper plate and a second sidewall that protrudes downward from an edge of the upper plate to cover the display panel, the covering member including a first combining portion that has a second hole corresponding to the first hole.

11. The display module of claim 10, wherein the combining member comprises:
    a body portion disposed at a corner of the receiving member; and a second combining portion protruding outward from a side face of the body portion, the second combining portion including the first hole.

12. The display module of claim 11, wherein the second combining portion is disposed between upper and lower surfaces of the body portion.

13. The display module of claim 11, wherein the first sidewall at the corner is removed to expose the body portion and the second combining portion.

14. The display module of claim 11, wherein the body portion is bent according to the corner of the bottom plate to form an L-shape.

15. The display module of claim 11, wherein the first combining portion is disposed at a corner of the covering member, so that the first combining portion corresponds to the second combining portion.

16. The display module of claim 11, further comprising a supporting member disposed on the body portion of the combining member, the supporting member supporting the display panel.

17. The display module of claim 16, wherein the supporting member is bent according to the corner of the bottom plate to form an L-shape.

18. The display module of claim 16, wherein the supporting member is integrally formed with the combining member.

19. The display module of claim 10, further comprising a plurality of middle members combined with the receiving member, the middle chassis pieces supporting the display panel.

20. The display module of claim 19, wherein each middle chassis piece overlaps an edge portion of the corresponding combining member, so that the combining member and the middle chassis are combined via a screw penetrating the edge portion.

21. The display module of claim 10, further comprising:
a second receiving member that receives end portions of the lamp to fix the lamp, the first receiving member receiving the second receiving member; and
a lamp covering member that combines the second receiving member to cover the end portions of the lamp.

22. The display module of claim 10, wherein the display panel corresponds to the liquid crystal display panel.

23. A display apparatus comprising:
(i) a display module including;
a lamp that generates a light;
a receiving member that receives the lamp, the receiving member including a first bottom plate and a first sidewall protruding upward from an edge of the bottom plate;
a combining member that is combined with the receiving member, the combining member including a first hole;
a display panel that displays an image by using the light generated from the lamp; and
a covering member that includes an upper plate and a second sidewall protruding downward from an edge of the upper plate to cover the display panel, the covering member including a first combining portion that has a second hole corresponding to the first hole; and
(ii) a case that covers the display module, the case including a second combining portion that has a fixing hole corresponding to the first and second holes.

24. The display apparatus of claim 23, wherein the case includes:
a rear case that receives the display module; and
a front case that is combined with the rear case to cover the display module.

25. The display apparatus of claim 24, wherein the second combining member is disposed on the rear case.

26. The display apparatus of claim 25, wherein the rear case is combined with display panel by a screw that penetrates the second and first holes in sequence to reach the fixing hole.

* * * * *